United States Patent
Kasslin et al.

(10) Patent No.: US 9,473,946 B2
(45) Date of Patent: Oct. 18, 2016

(54) METHOD, APPARATUS, AND COMPUTER PROGRAM PRODUCT FOR TEMPORARY RELEASE OF RESOURCES IN RADIO NETWORKS

(75) Inventors: Mika Kasslin, Espoo (FI); Jari Henrik Junell, Espoo (FI)

(73) Assignee: Nokia Technologies Oy, Espoo (FI)

( * ) Notice: Subject to any disclaimer, the term of this patent is extended or adjusted under 35 U.S.C. 154(b) by 772 days.

(21) Appl. No.: 13/417,653

(22) Filed: Mar. 12, 2012

(65) Prior Publication Data
US 2013/0235810 A1  Sep. 12, 2013

(51) Int. Cl.
*H04W 4/00* (2009.01)
*H04W 16/14* (2009.01)
*H04W 16/06* (2009.01)

(52) U.S. Cl.
CPC .............. *H04W 16/14* (2013.01); *H04W 16/06* (2013.01)

(58) Field of Classification Search
None
See application file for complete search history.

(56) References Cited

U.S. PATENT DOCUMENTS

| | | | |
|---|---|---|---|
| 7,826,459 B2 | 11/2010 | Xhafa et al. | |
| 7,830,907 B1 | 11/2010 | Petranovich et al. | |
| 7,856,008 B2 | 12/2010 | Ayyagari et al. | |
| 7,915,867 B1 | 3/2011 | Bulthaup et al. | |
| 7,953,412 B2 | 5/2011 | Lee et al. | |
| 7,983,216 B2 | 7/2011 | Iyer et al. | |
| 8,068,440 B2 * | 11/2011 | Stanwood ............. | H04W 28/24 370/252 |
| 8,165,106 B2 | 4/2012 | Yang et al. | |
| 8,194,549 B2 | 6/2012 | Huber et al. | |
| 8,300,624 B2 | 10/2012 | Zeller et al. | |
| 8,363,579 B2 | 1/2013 | Li et al. | |
| 8,379,551 B2 | 2/2013 | Wietfeldt et al. | |
| 8,451,789 B2 | 5/2013 | Junell et al. | |
| 2003/0058829 A1 | 3/2003 | Batra | |
| 2005/0027871 A1 | 2/2005 | Bradley et al. | |
| 2006/0002326 A1 | 1/2006 | Vesuna | |
| 2006/0286986 A1 | 12/2006 | Kim et al. | |
| 2007/0086426 A1 | 4/2007 | Bonta et al. | |
| 2007/0104153 A1 * | 5/2007 | Chen ...................... | H04J 13/00 370/335 |
| 2007/0135162 A1 | 6/2007 | Banerjea et al. | |
| 2007/0161364 A1 | 7/2007 | Surineni et al. | |
| 2007/0207800 A1 | 9/2007 | Daley et al. | |
| 2007/0254596 A1 | 11/2007 | Corson et al. | |

(Continued)

FOREIGN PATENT DOCUMENTS

| | | |
|---|---|---|
| EP | 1863303 | 12/2007 |
| EP | 1883258 | 1/2008 |

(Continued)

OTHER PUBLICATIONS

"Part 15.2: Coexistence of Wireless Personal Area Networks with Other Wireless Devices Operating in Unlicensed Frequency Bands" Mar. 24, 2003, IEEE, Inc.

(Continued)

*Primary Examiner* — Nicholas Sloms
(74) *Attorney, Agent, or Firm* — Locke Lord LLP

(57) ABSTRACT

Method, apparatus, and computer program product embodiments are disclosed to for resource coexistence management in RF white spaces. An example embodiment includes a method including receiving by a control node of a wireless network, an allocation of resources and an indication of allowance to release resources temporarily from a network controller serving the control node; and transmitting by the control node to the network controller, a message indicating temporary release of a portion of the allocated resources.

23 Claims, 22 Drawing Sheets

(56) References Cited

U.S. PATENT DOCUMENTS

| | | |
|---|---|---|
| 2007/0274273 A1 | 11/2007 | Grushkevich et al. |
| 2008/0040452 A1 | 2/2008 | Rao et al. |
| 2008/0043705 A1 | 2/2008 | Desai et al. |
| 2008/0075059 A1* | 3/2008 | Kermoal ............ H04B 17/382 370/343 |
| 2008/0089279 A1 | 4/2008 | Hu et al. |
| 2008/0108363 A1 | 5/2008 | Yu et al. |
| 2008/0108365 A1 | 5/2008 | Buddhikot et al. |
| 2008/0137627 A1 | 6/2008 | Fischer et al. |
| 2008/0159258 A1 | 7/2008 | Ji et al. |
| 2008/0192806 A1 | 8/2008 | Wyper et al. |
| 2008/0228878 A1 | 9/2008 | Wu et al. |
| 2008/0233875 A1 | 9/2008 | Desai et al. |
| 2008/0253341 A1 | 10/2008 | Cordeiro et al. |
| 2008/0261639 A1 | 10/2008 | Sun et al. |
| 2008/0268892 A1 | 10/2008 | Hamdi et al. |
| 2008/0285525 A1 | 11/2008 | Hu |
| 2008/0298310 A1 | 12/2008 | Hu |
| 2009/0040937 A1 | 2/2009 | Xhafa et al. |
| 2009/0059856 A1 | 3/2009 | Kermoal et al. |
| 2009/0122755 A1 | 5/2009 | Seok et al. |
| 2009/0149208 A1 | 6/2009 | Huttunen et al. |
| 2009/0161614 A1 | 6/2009 | Grandblaise et al. |
| 2009/0196180 A1 | 8/2009 | Bahl et al. |
| 2009/0197627 A1 | 8/2009 | Kuffner et al. |
| 2009/0225717 A1 | 9/2009 | Banerjea |
| 2009/0247201 A1 | 10/2009 | Ye et al. |
| 2009/0279449 A1 | 11/2009 | Kneckt et al. |
| 2009/0279491 A1 | 11/2009 | Kim et al. |
| 2009/0298522 A1 | 12/2009 | Chaudhri et al. |
| 2010/0002608 A1 | 1/2010 | Goldhamer |
| 2010/0046440 A1 | 2/2010 | Singh |
| 2010/0087216 A1 | 4/2010 | Ko et al. |
| 2010/0091735 A1 | 4/2010 | Kim et al. |
| 2010/0097950 A1 | 4/2010 | Jeon |
| 2010/0097952 A1 | 4/2010 | McHenry et al. |
| 2010/0142463 A1 | 6/2010 | Hu |
| 2010/0157910 A1* | 6/2010 | Nentwig ............ H04L 5/0007 370/329 |
| 2010/0220676 A1 | 9/2010 | Grandblaise et al. |
| 2010/0220687 A1 | 9/2010 | Reznik et al. |
| 2010/0232380 A1 | 9/2010 | Choi et al. |
| 2010/0248631 A1 | 9/2010 | Chaudhri et al. |
| 2010/0273426 A1 | 10/2010 | Walley et al. |
| 2010/0304685 A1 | 12/2010 | Wietfeldt et al. |
| 2010/0309317 A1 | 12/2010 | Wu et al. |
| 2010/0309806 A1 | 12/2010 | Wu et al. |
| 2010/0331029 A1 | 12/2010 | Linsky et al. |
| 2011/0039554 A1 | 2/2011 | Bims |
| 2011/0063975 A1* | 3/2011 | Ohseki ............ H04W 72/1257 370/230.1 |
| 2011/0090887 A1 | 4/2011 | Kim et al. |
| 2011/0090890 A1 | 4/2011 | Seok et al. |
| 2011/0116488 A1 | 5/2011 | Grandhi |
| 2011/0179174 A1 | 7/2011 | Kasslin et al. |
| 2011/0199989 A1 | 8/2011 | Wietfeldt et al. |
| 2011/0207411 A1 | 8/2011 | Phillips |
| 2011/0222493 A1 | 9/2011 | Mangold et al. |
| 2011/0243094 A1 | 10/2011 | Dayal et al. |
| 2011/0250857 A1 | 10/2011 | Reial et al. |
| 2011/0250921 A1 | 10/2011 | Reial |
| 2011/0287802 A1 | 11/2011 | Ma et al. |
| 2011/0305206 A1 | 12/2011 | Junell et al. |
| 2011/0310767 A1 | 12/2011 | Hu |
| 2012/0057533 A1 | 3/2012 | Junell et al. |
| 2012/0069746 A1 | 3/2012 | Park |
| 2012/0077506 A1 | 3/2012 | Wietfeldt et al. |
| 2012/0094681 A1* | 4/2012 | Freda ............ H04W 72/02 455/452.1 |
| 2012/0106512 A1 | 5/2012 | Banerjea et al. |
| 2012/0127011 A1 | 5/2012 | Lee et al. |
| 2012/0134328 A1 | 5/2012 | Gauvreau et al. |
| 2012/0182883 A1 | 7/2012 | Junell et al. |
| 2012/0195269 A1 | 8/2012 | Kang et al. |
| 2012/0201209 A1 | 8/2012 | Lee et al. |
| 2012/0225662 A1 | 9/2012 | Jo et al. |
| 2012/0329384 A1 | 12/2012 | Boldyrev et al. |
| 2013/0155995 A1 | 6/2013 | Jo et al. |
| 2014/0161002 A1* | 6/2014 | Gauvreau ............ H04W 16/24 370/280 |

FOREIGN PATENT DOCUMENTS

| | | |
|---|---|---|
| EP | 2083591 | 7/2009 |
| GB | 2461724 | 1/2010 |
| JP | 2009153136 | 7/2009 |
| JP | 2012147256 | 8/2012 |
| JP | 201229177 | 9/2012 |
| WO | 03001742 | 1/2003 |
| WO | 2005045689 | 5/2005 |
| WO | 2007131958 | 3/2007 |
| WO | 2010027308 | 3/2010 |
| WO | 2010043270 | 4/2010 |
| WO | 2011022506 | 2/2011 |
| WO | WO 2012/028769 | 3/2012 |
| WO | WO 2012030174 | 3/2012 |
| WO | WO 2012051303 | 4/2012 |

OTHER PUBLICATIONS

J. Zhu, et al., Multi-Radio Coexistence: Challenges and Opportunities; "Proceedings—16th International Conference on Computer Communications and Networks", Aug. 3, 2007; pp. 358-364.

IEEE 802.15.2 (Part 15.2: Coexistence of Wireless Personal Area Networks with Other Wireless Devices Operating in Unlicensed Frequency Bands, dated Mar. 24, 2003; hereinafter IEEE 802.15.2.

Zhu et al (Proceedings—16th International Conference on Computer Communications and Networks, paper submitted "Multi-Radio Coexistence: Challenges and Opportunities" dated Aug. 13-16, 2007.

Extended European Search Report for Application No. 13154998. 2-1854, completed Jun. 5, 2013.

Extended European Search Report for Application No. 13155031. 1-1854, completed Jun. 6, 2013.

International Search Report and Written Opinion mailed Jul. 29, 2011 in International Application Serial No. PCT/FI2011/050266, 13pp.

International Search Report mailed Nov. 29, 2011 in International Application Serial No. PCT/FI2011/050714, 13pp.

European Search Report dated Jun. 27, 2012 for European Application No. 12155105.5-1525.

International Search Report and Written Opinion mailed Mar. 14, 2012 in International Application Serial No. PCT/FI2011/051128, 15pp.

International Search Report and Written Opinion mailed Apr. 2, 2012 in International Application Serial No. PCT/FI2011/051127, 15pp.

International Search Report and Written Opinion mailed Dec. 12, 2011 for International Application Serial No. PCT/FI2011/050777, 12pp.

International Search Report for International Application No. PCT/FI2011/050591 dated Sep. 28, 2011.

International Search Report issued Oct. 11, 2011 in International Application Serial No. PCT/FI2011/050703, 13pp.

Karama Hamdi, et al., "Power Control in Cognitive Radio Systems Based on Spectrum Sensing Side Information", Proc. IEEE International Conference on Communications (ICC'07), pp. 5161-5165, Jun. 2007.

Ian F. Akyildiz, et al. "A Survey on Spectrum Management in Cognitive Radio Networks", IEEE Communications 108 Apr. 2008, pp. 40-48.

Dong In Kim, et al., "Joint Rate and Power Allocation for Cognitive Radios in Dynamic Spectrum Access Environment", IEEE Transactions on Wireless Communications, vol. 7, No. 12, Dec. 2008, pp. 5517-5527.

Fabrizio Granelli, et al., "Standardization and Research in Cognitive and Dynamic Spectrum Access Networks: IEEE SCC41 Efforts and Other Activities", IEEE Communications Magazine • Jan. 2010, pp. 71-79.

(56) References Cited

OTHER PUBLICATIONS

Zander, "Can We Find (and Use) "Spectrum Holes"? Spectrum Sensing and Spatial Reuse Opportunities in "Cognitive" Radio Systems", Vehicular Technology Conference, 2009, VTC Spring 2009. IEEE 69th, Date: Apr. 26-29, 2009, pp. 1-5.
H. Harada, "Research and development on cognitive and software radio technologies—Devices and hardware platform—" General assembly of URSI, Aug. 2008., 4pp.
A. Mody et al., A Survey of IEEE Standards Supporting Cognitive Radio and Dynamic Spectrum Access. IEEE, 978-1-4244-2677-5/08, pp. 1-7.
R. Venkatesha Prasad et al., "Cognitive Functionality in Next Generation Wireless Networks: Standardization Efforts", IEEE Communications Magazine, Apr. 2008, pp. 72-78.
Dong Heon Lee et al., "Self-coexistence techniques for cognitive radio LANs/PANS", 21st Annual IEEE International Symposium on Personal Indoor and Mobile Radio Communications (PIMRC), Sep. 25, 2010, IEEE, Piscataway, NJ, USA, pp. 1516-1520, Chapter III B.
Ashraf, I. et al., "Impact of Interfering Bluetooth Piconets on a Collocated p-Persistent CSMA-Based VVLAN", IEEE Transactions on Vehicular Technology, vol. 58, No. 9, Nov. 1, 2009, pp. 4962-4975.
Asterjadhi, A. et al., "JENNA: A jamming Evasive Network-Coding Neighbor-Discovery Algorithm for Cognitive radio Networks", IEEE Wireless Communications, vol. 17, No. 4, Aug. 1, 2010, pp. 24-32.
Baykas, T., et al., "Overview of TV White Spaces: Current regulations, standards and coexistence between secondary users", 2010 IEEE 21st International Symposium on Personal, Indoor and Mobile Radio Communications Workshops (PIMRC Workshops), Sep. 26-30, 2010, Istanbul, Turkey, IEEE, Piscataway, NJ, USA, pp. 38-43.
Peha, J.M.: "Sharing Spectrum Through Spectrum Policy reform and Cognitive Radio", Proceedings of teh IEEE, vol. 97, No. 4, Jan. 4, 2009, pp. 708-719.
P. Camarda et al., "An Exclusive Self-Coexistence (ESC) Resource Sharing Algorithm for Cognitive 802.22 Networks," 2010 5th International Symposium on Wireless Pervasive Computing (ISWPC), pp. 128-133.
Mark Cummings, "Perspectives on Architecture for IEEE 802.191.1", Nov. 11, 2010, pp. 1-15.
S. Filin et al., P802.19.1 General Architecture, IEEE 802.19-10-00007, Jan. 16, 2010, pp. 1-9.
Minnie Ingersoll, "White Spaces Database," IEEE 802.19-09-/0047r0, Jul. 16, 2009, pp. 1-23.
Paine et al., "WhiteSpace Coexistence Use Cases", IEEE P802.19 Wireless Coexistence, IEEE 802.19-09/26r4, Jul. 16, 2009, pp. 1-14.
Chen Sun et al., "TVWS Coexistence Use Cases", IEEE 802.19 DCN 19-10-0008-01-0000, pp. 1-14.
T. Baykas, et al; IEEE P802.19-10/0055r3 Wireless Coexistence—System Design Document; Mar. 18, 2010, p. 1-15.
M. Rahman; IEEE 802.19-10-0010-00-tvws; Possible Coexistence Cases in TVWS and Topics to be Considered in P802.19.1; Jan. 1, 2009; pp. 1-10.
Sherman, M.; sg-whitespace-09-0055-00-0000 TV Whitespace Tutorial; Mar. 10, 2009.
Ruuska P. et al. "P802.19 System Architecture", IEEE Mentor, IEEE Standards Association, doc.: IEEE 802.19-10/46r3, Mar. 17, 2010, [online], [retrieved on Dec. 1, 2011]. Retrieved from the Internet: <URL: https:// mentor.ieee.org/802.19/documents>.
Harada et al., "Research, Development, and Standards Related Activities on Dynamic Spectrum Access and cognitive Radio", New Frontiers in Dynamic Spectrum, 2010 IEEE Symposium on Apr. 6, 2010, IEEE, Piscataway, NJ, USA.
Akyildiz I. et al., "Next Generation/Dynamic Spectrum Access/Cognitive Radio Wireless Networks: A survey", Sep. 15, 2006, Elsevier Science Publishers B.V., Amsterdam, NL, ISSN 1389-1286, pp. 2127-2159.
J. C. Zuniga, et al; IEEE 802-SG-WhiteSpace-09/0032r4; Media Independent Coexistence; Mar. 11, 2009, p. 1-10.
H. Wang, et al; IEEE 802.19-09/0034r3; Media Independent Coexistence for Devices in White Space; Jul. 10, 2009, p. 1-12.
M. Kasslin; IEEE 802.19-10/0055r02; Wireless Coexistence; System Design Document; Mar. 18, 2010, p. 1-12.
Cavalcanti et al, "IEEE 802.22/07/0121 r1 : Proposed text changes to Section 6.21.2 Self-coexistence in IEEE 802.22/D0.2 Draft Standard" published in Mar. 2007.
Cordeiro et al, "Cognitive PHY and MAC Layers for Dynamic Spectrum Access and Sharing of TV Bands", published by ACM on Aug. 5, 2006.
J. Junell, et al.; IEEE P802.19, Wireless Coexistence, Proposal on coexistence system services and protocols; Nov. 7, 2010, XP002681996; pp. 1-46.
J. Junell, et al.; Coexistence for unlicensed spectrum users in white spaces; Applied Sciences in Biomedical and Communication Technologies (ISABEL); 3rd International Symposium on, IEEE; Nov. 7, 2010, pp. 1-5.
Extended European Search Report dated Aug. 30, 2012 for EP Application No. 12162039.7-1525.
International Search Report for International Application No. PCT/FI2012/050522 mailed Sep. 25, 2012.
Baykas, T et al. Developing a standard for TV white space coexistence: technical challenges and solution approaches. IEEE Wireless Communications, Feb. 1, 2012, pp. 10-22, ISSN 1536-1284. the whole document.
International Search Report for International Application No. PCT/FI2013/050717 mailed Nov. 5, 2013.
Draft ETSI TR103 067 V0.0.7 (Nov. 2011) Reconfigurable Radio Systems (RRS); Feasibility Study on Radio Frequency (RF) Performances for Cognitive Radio Systems Operating in UHF TV Band White Spaces.
U.S. Appl. No. 12/815,620, filed Jun. 15, 2010, Junell et al.
U.S. Appl. No. 12/875,183, filed Sep. 3, 2010, Junell et al.
U.S. Appl. No. 12/875,187, filed Sep. 3, 2010, Junell et al.
U.S. Appl. No. 12/915,141, filed Oct. 29, 2010, Kasslin et al.
U.S. Appl. No. 12/915,154, filed Oct. 29, 2010, Kasslin et al.
U.S. Appl. No. 13/006,802, filed Jan. 14, 2011, Junell et al.
U.S. Appl. No. 13/006,857, filed Jan. 14, 2011, Junell et al.
U.S. Appl. No. 13/019,615, filed Feb. 2, 2011, Junell et al.
U.S. Appl. No. 13/041,613, filed Mar. 7, 2011, Kasslin et al.
U.S. Appl. No. 13/100,734, filed May 4, 2011, Jari Junell.
U.S. Appl. No. 13/184,643, filed Jul. 18, 2011, Kasslin, et al.
U.S. Appl. No. 13/311,779, filed Dec. 6, 2011, Rinne, et al.
U.S. Appl. No. 13/585,051, filed Aug. 14, 2012, Kasslin, et al.
U.S. Appl. No. 13/417,457, filed Mar. 12, 2012, Kasslin, et al.
Japanese Office Action dated Feb. 21, 2014 for Japanese Application No. 2013-038446.
IEEE P802.15.2 Draft No. 09; Coexistence of Wireless Personal Area Networks with Other Wireless Devices Operating in Unlicensed Frequency Bands; Mar. 24, 2003, IEEE Inc. Standards.
J. Zhu, et al.,: Multi-Radio Coexistence: Challenges and Opportunities; Proceedings 16th International Conference on Computer Communications and Networks; Aug. 3, 2007, pp. 358-364.

* cited by examiner

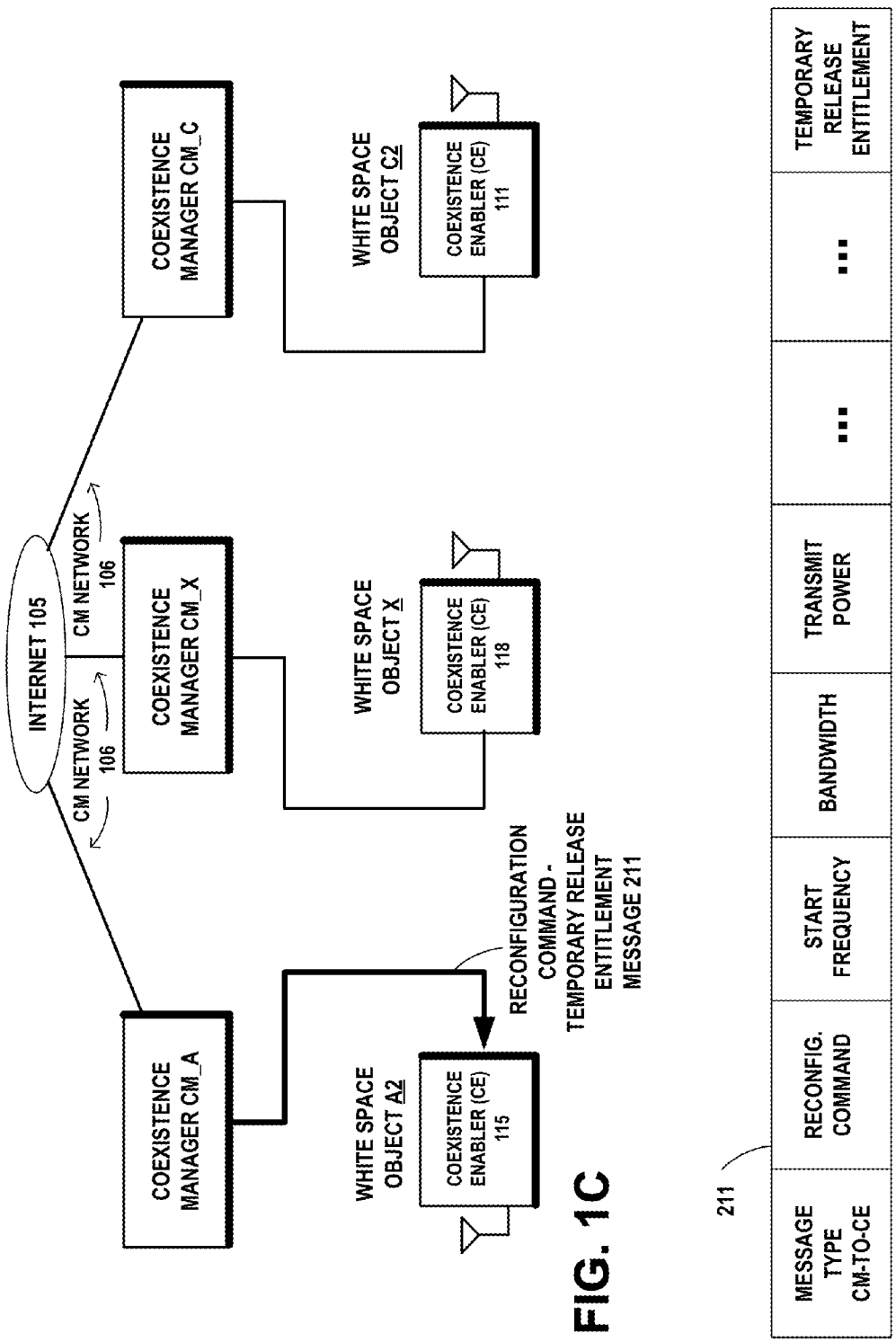

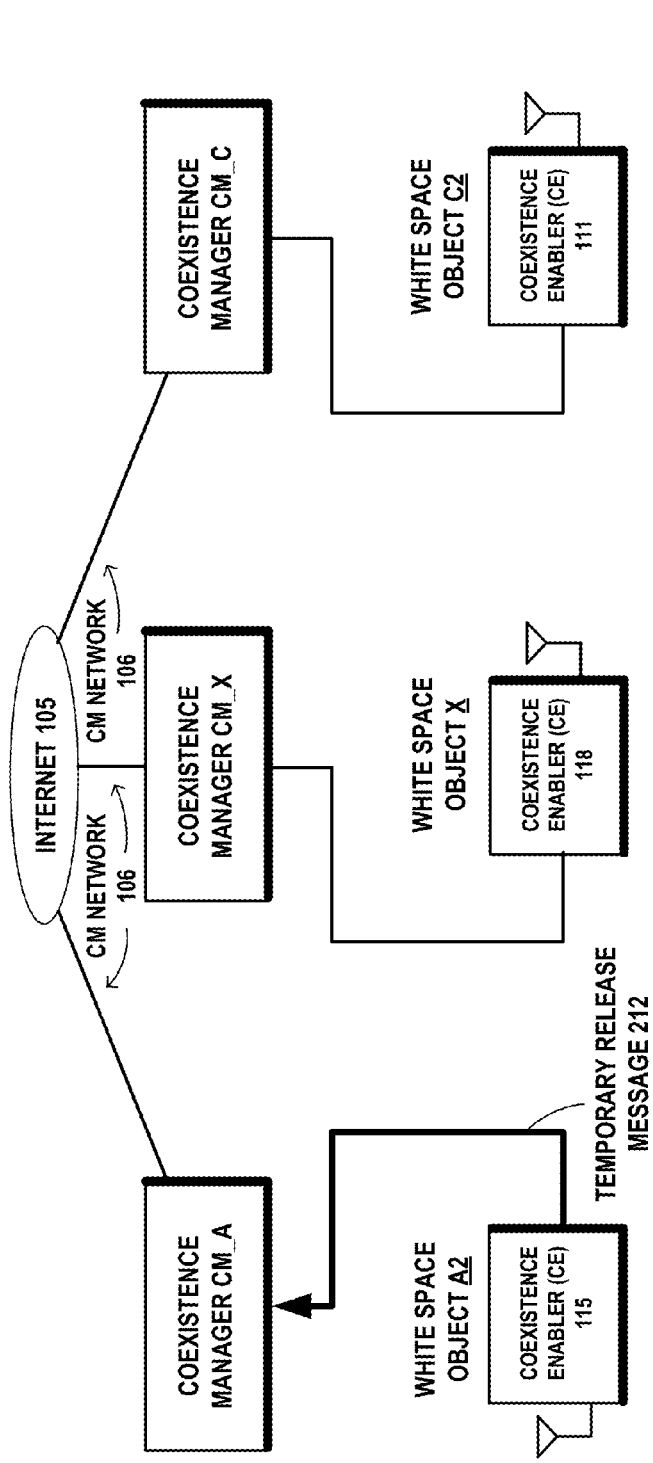
FIG. 1D
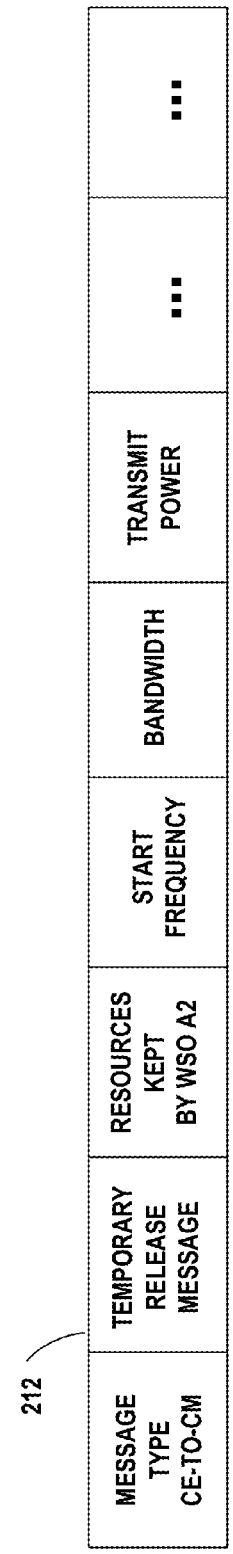
FIG. 2B CE-TO-CM TEMPORARY RELEASE MESSAGE 212

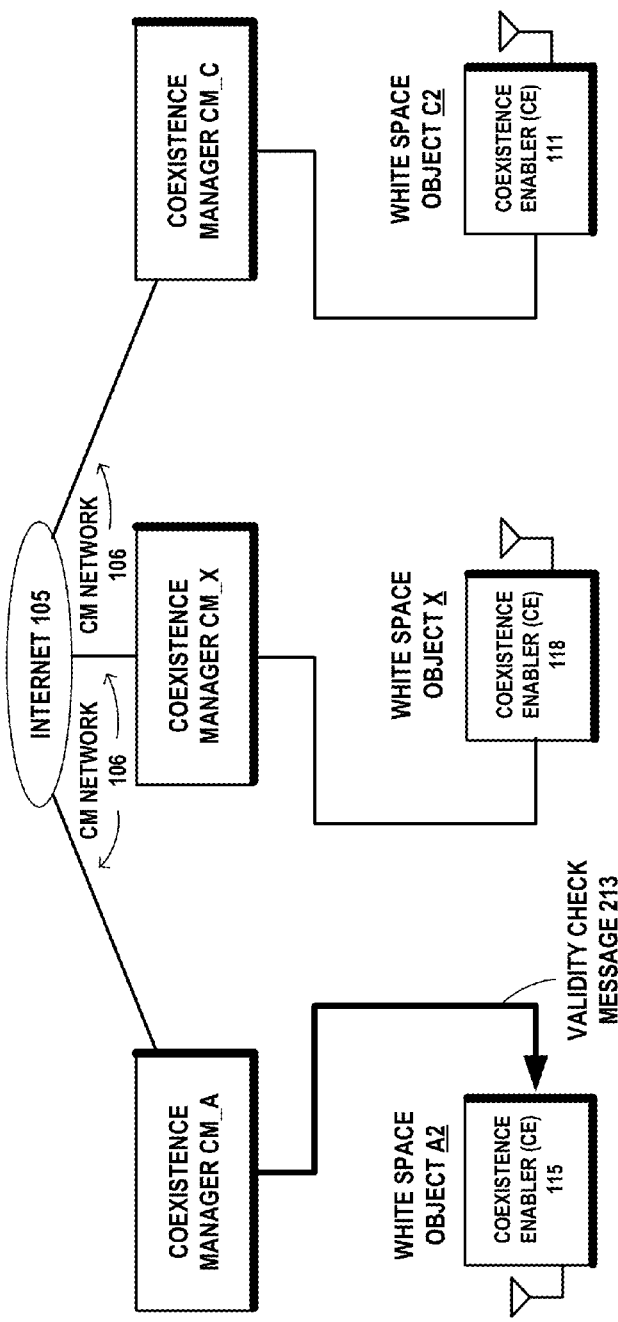
FIG. 1E
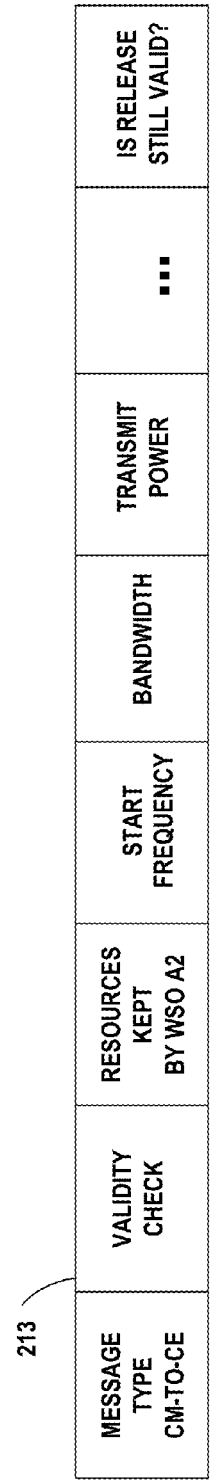
FIG. 2C CM-TO-CE VALIDITY CHECK MESSAGE 213

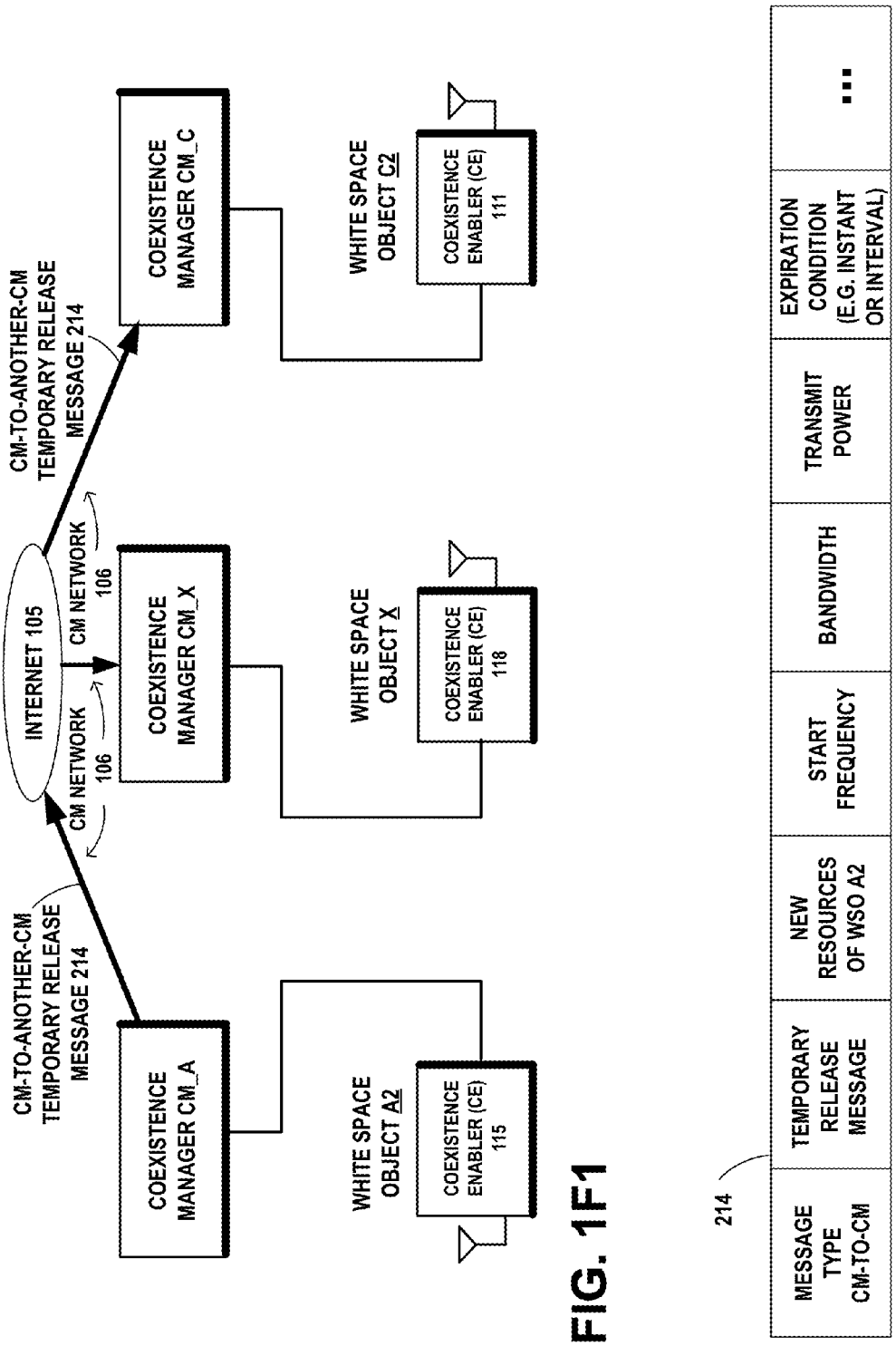

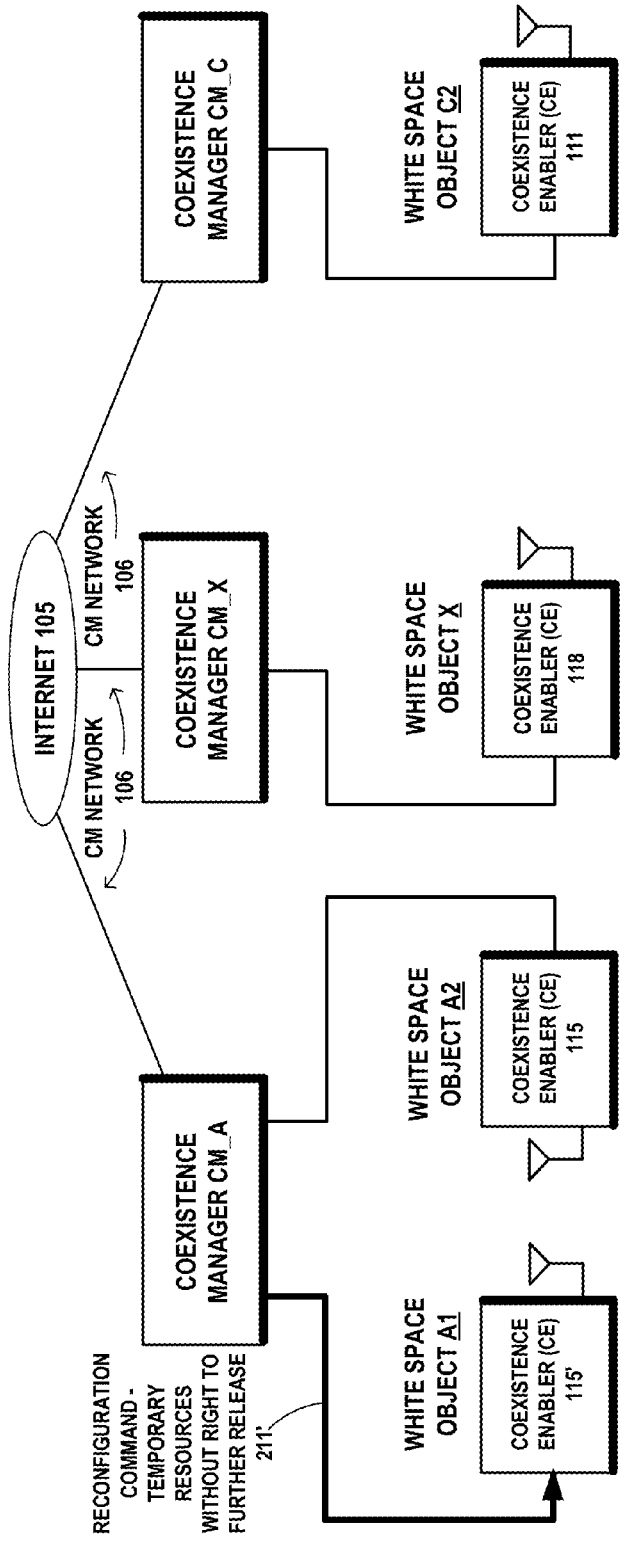
FIG. 1F2
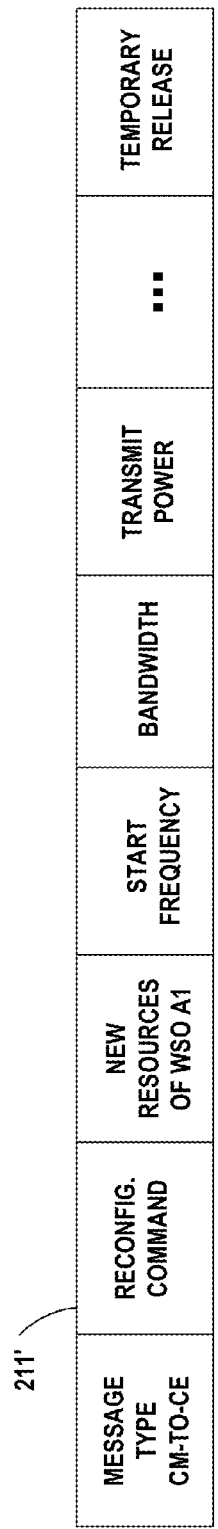
FIG. 2G  CM-TO-CE: RECONFIGURATION COMMAND MESSSAGE 211'

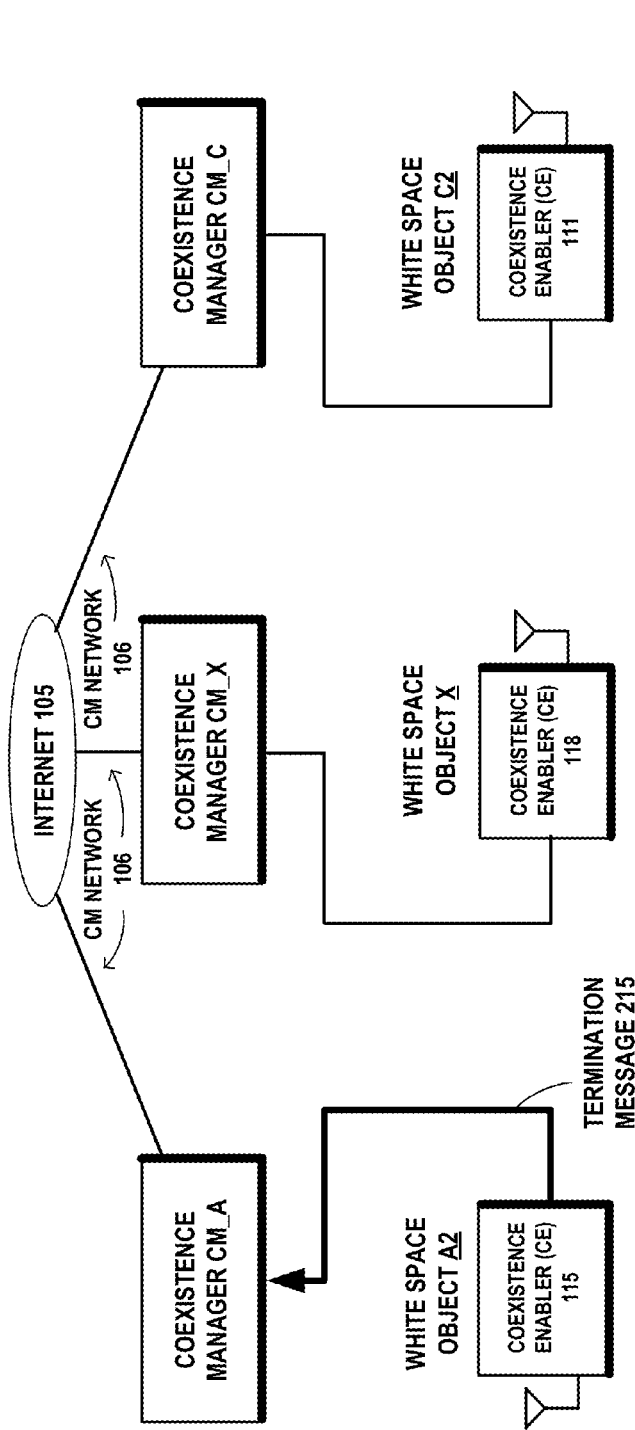
FIG. 1H
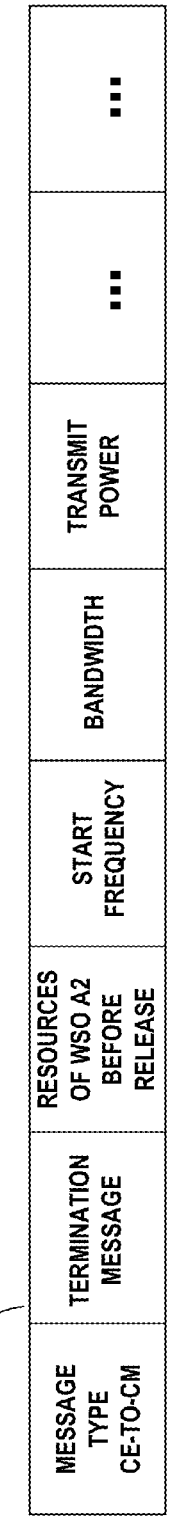
FIG. 2E   CE-TO-CM TERMINATION MESSAGE 215

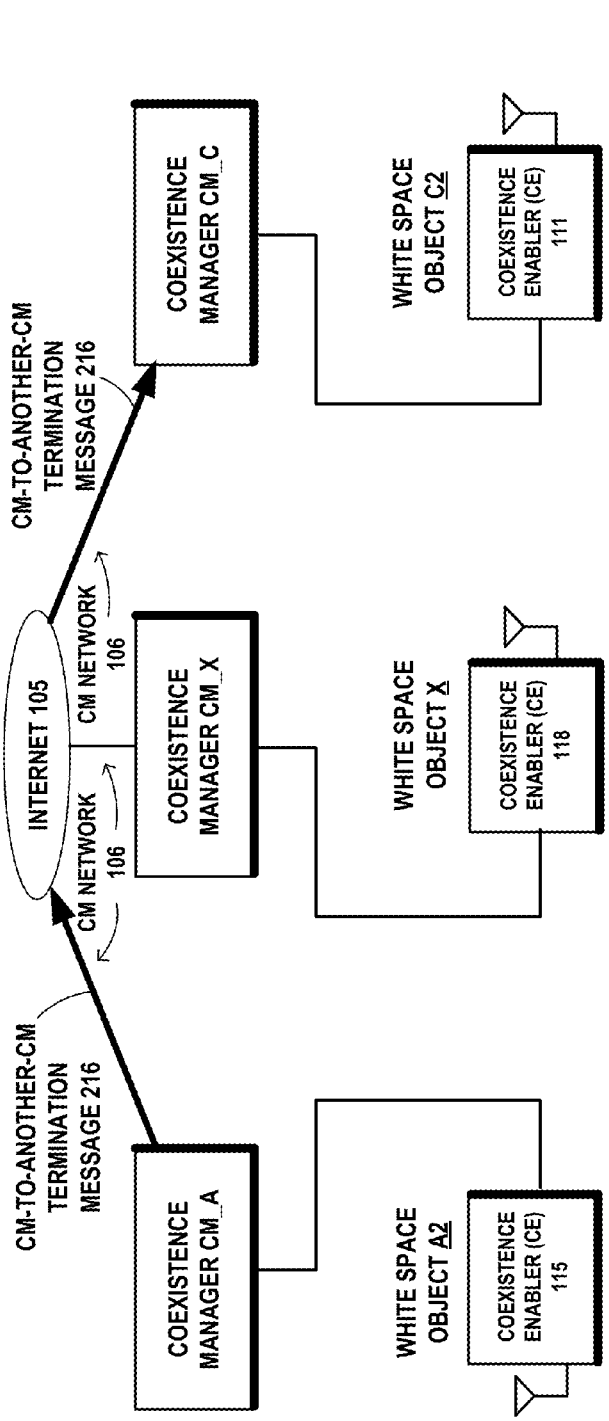
FIG. 1I
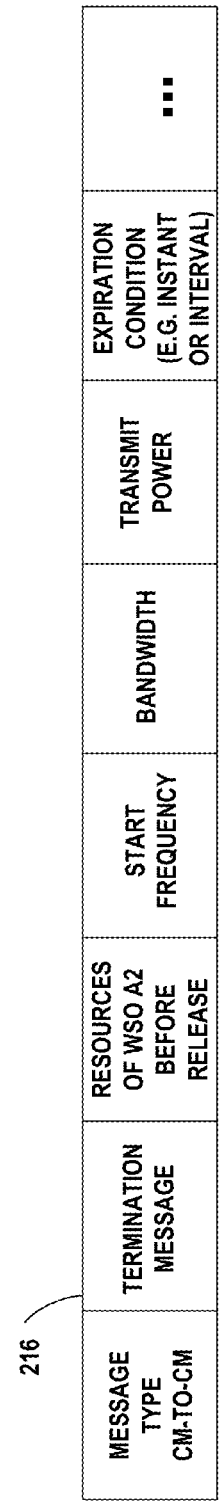
FIG. 2F  CM-TO-ANOTHER-CM TERMINATION MESSAGE 216

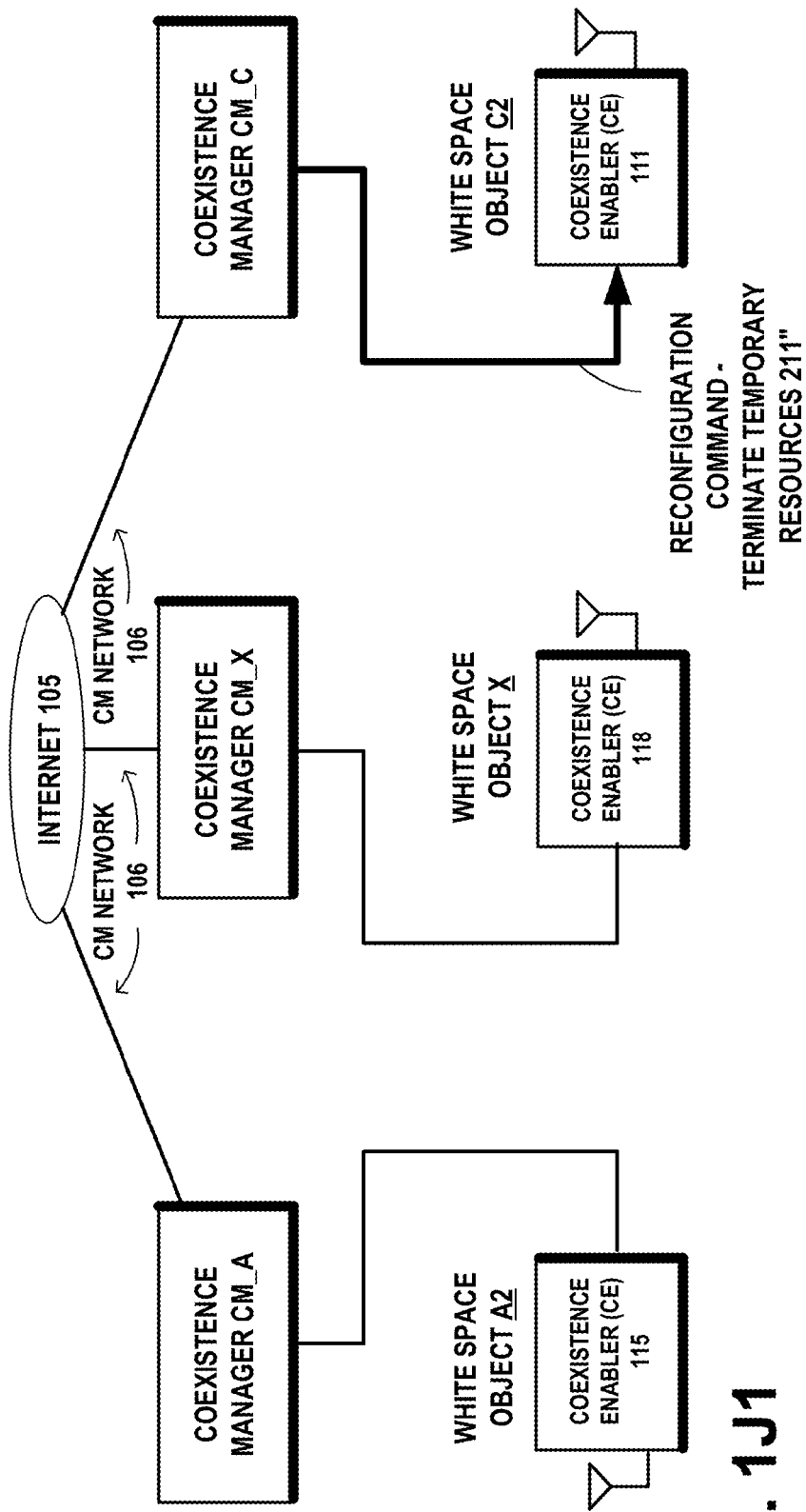
FIG. 1J1

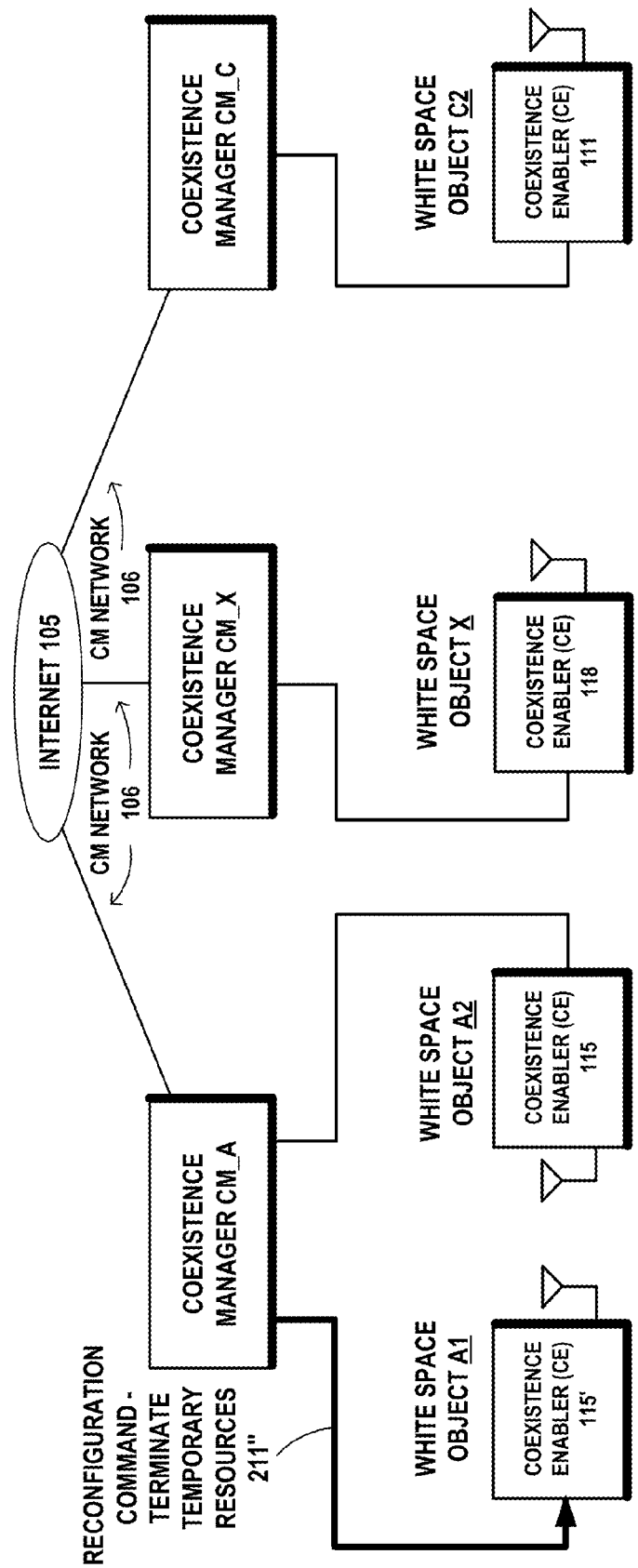
FIG. 1J2

FIG. 6A

STEP 602: RECEIVING BY A CONTROL NODE OF A WIRELESS NETWORK, AN ALLOCATION OF RESOURCES AND AN INDICATION OF ALLOWANCE TO RELEASE RESOURCES TEMPORARILY FROM A NETWORK CONTROLLER SERVING THE CONTROL NODE; AND

STEP 604: TRANSMITTING BY THE CONTROL NODE TO THE NETWORK CONTROLLER, A MESSAGE INDICATING TEMPORARY RELEASE OF A PORTION OF THE ALLOCATED RESOURCES.

STEP 682: RECEIVING BY A NETWORK CONTROLLER, RESOURCES FROM ANOTHER NETWORK CONTROLLER, WHICH WERE TEMPORARILY RELEASED BY A CONTROL NODE SERVED BY THE OTHER NETWORK CONTROLLER; AND

STEP 684: RETURNING BY THE NETWORK CONTROLLER, THE RELEASED RESOURCES TO THE OTHER NETWORK CONTROLLER, WHEN THE NETWORK CONTROLLER RECEIVES A COMMAND FROM THE OTHER NETWORK CONTROLLER TO RETURN THE RELEASED RESOURCES.

METHOD, APPARATUS, AND COMPUTER PROGRAM PRODUCT FOR TEMPORARY RELEASE OF RESOURCES IN RADIO NETWORKS

FIELD

The field of the invention relates to efficient radio spectrum use, and more particularly to resource coexistence management in RF white spaces.

BACKGROUND

Use of radio frequency bands of the electromagnetic spectrum is regulated by governments in most countries, by allocating specific frequency bands to particular types of uses, such as licensed bands for commercial radio and television broadcasting, cellular telephony, mobile networks such as CDMA2000, WCDMA, HSPA, LTE, and IMT, maritime radio, police, fire, and public safety radio, GPS, radio astronomy, earth stations for satellite communications, and many other uses. Governments also allocate unlicensed bands, for example, for Wireless Regional Area Network (WRAN) broadband access for rural areas and wireless local area networks (WLAN) and wireless personal area networks (WPAN), such as the industrial, scientific, and medical (ISM) band.

In the United States, the Federal Communications Commission (FCC) regulates use of the radio spectrum, including radio and television broadcasting. Frequencies are allocated according to a bandplan in which guard bands are assigned between the allocated radio bands to avoid interference between adjacent signals. There are also unassigned frequency bands in the spectrum that either have never been used or have become free as a result of changes in technology. Unassigned or un-used frequencies also appear locally inside the frequency bands, which are otherwise allocated in other locations. The unassigned frequency bands and guard bands are referred to as white spaces.

TV white space may be broadly defined as broadcast television spectrum that is unused by licensed services. There are at least two categories of TV white space: [1] Dedicated TV white space is a portion of the spectrum that the FCC has reallocated to unlicensed use from previously analog broadcast usage, and [2] Locally unused spectrum by licensed TV broadcasters in a geographic area.

[1] Dedicated TV white space: In the United States, the FCC has dedicated approximately 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used. Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

[2] Locally unused spectrum by licensed TV broadcasters: The FCC has adopted rules to allow unlicensed radio transmitters to operate in the broadcast television spectrum at locations where that spectrum is not being used by licensed broadcasters. The FCC proposes two mechanisms to enable the unlicensed transmitter to discover the available channels: geo-location and database based approach, and spectrum sensing. The use of one of the mechanisms is required for the unlicensed transmitter. The FCC proposed the use of geolocation to establish the location of the unlicensed transmitter and a database of TV bands use by licensed broadcasters organized by their geographic coverage areas, to enable the unlicensed transmitter to know where local TV band white spaces may be available. The FCC proposed the use of spectrum sensors in the unlicensed transmitter to detect the presence of the incumbent, primary TV broadcaster's signal in the local TV band to enable the unlicensed transmitter to immediately relinquish using the band. A primary user in such a local TV band would be an incumbent TV broadcaster licensed to operate in that band, but in those geographic areas where there are no licensed incumbent TV broadcasters in operation, other unlicensed secondary users may make use of that band. There may be also other incumbent users in the TV band, which the secondary users should avoid, such as program making and special events (PMSE) systems.

In addition to the United States, other countries are also considering to enable unlicensed, secondary operation in TV band white spaces. The requirements may slightly differ in different countries, e.g. in the United States the maximum transmit power for unlicensed device is defined based on the device type, whereas in Europe location specific maximum transmission power has been considered. In that case the maximum allowed transmission power for an unlicensed device would depend on the device geo-location, i.e. the distance from the primary users. The device characteristics, such as emission mask/ACLR (adjacent channel leakage ratio) may affect the maximum allowed transmission power.

Other RF spectrum white spaces may be defined as RF spectrum that is locally unused in certain geographic areas, such as for example frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band. Further, other schemes of secondary use of spectrum, other than unlicensed schemes may exist, such as licensing, regulator defined policies, cognitive principles, or authorized shared access.

SUMMARY

Method, apparatus, and computer program product embodiments are disclosed to for efficient radio spectrum use, and more particularly to resource coexistence management in RF white spaces.

An example embodiment of the invention includes a method comprising:

receiving by a control node of a wireless network, an allocation of resources and an indication of allowance to release resources temporarily from a network controller serving the control node; and transmitting by the control node to the network controller, a message indicating temporary release of a portion of the allocated resources.

An example embodiment of the invention includes a method comprising:

periodically indicating by the control node to the network controller, whether the release is still valid; and receiving by the control node, a return of the temporarily released resources from the network controller, when the release is no longer valid.

An example embodiment of the invention includes a method comprising:

wherein the periodically indicating by the control node to the network controller, whether the release is still valid, happens in response to receiving a request or status query from the network controller.

An example embodiment of the invention includes a method comprising:

receiving by a network controller, a temporary release message from a control node that it serves, indicating temporary release of a portion of resources allocated to the control node by the network controller;

periodically obtaining an indication from the control node whether the release is still valid; and returning the temporarily released resources to the control node when the release is no longer valid.

An example embodiment of the invention includes a method comprising:

wherein the periodically obtaining an indication from the control node whether the release is still valid, happens in response to sending a request or status query to the control node.

An example embodiment of the invention includes a method comprising:

transmitting by the network controller, at least a portion of the resources released by the control node, to one or more other network controllers; and receiving by the network controller, a return of the released resources from the one or more other network controllers, when the network controller transmits a command to the one or more other network controllers to return the released resources.

An example embodiment of the invention includes a method comprising:

receiving by a network controller, resources from another network controller, which were temporarily released by a control node served by the other network controller; and returning by the network controller, the released resources to the other network controller, when the network controller receives a command from the other network controller to return the released resources.

An example embodiment of the invention includes a method comprising:

transmitting by the network controller, at least a portion of the resources released by the control node, to a second control node that it serves; and receiving by the network controller, a return of the released resources from the second control node, when the network controller transmits a command to the second control node to return the released resources.

An example embodiment of the invention includes a method comprising:

receiving by a network controller, resources from another network controller, which were temporarily released by a control node served by the other network controller;

calculating by the network controller, a new resource allocation to a control node of the network controller without changing an existing allocation of a coexistence set of the control node; and allocating a new resource allocation to the control node with an indication to prohibit making a further a resource release;

returning by the network controller, the released resources to the other network controller, when the network controller receives a command from the other network controller to return the released resources.

An example embodiment of the invention includes an apparatus comprising:

at least one processor;

at least one memory including computer program code;

the at least one memory and the computer program code configured to, with the at least one processor, cause the apparatus at least to:

receive an allocation of resources and an indication of allowance to release resources temporarily from a network controller serving the apparatus; and transmit to the network controller, a message indicating temporary release of a portion of the allocated resources.

An example embodiment of the invention includes an apparatus comprising:

the at least one memory and the computer program code configured to, with the at least one processor, cause the apparatus at least to:

periodically indicate to the network controller, whether the release is still valid; and receive a return of the temporarily released resources from the network controller, when the release is no longer valid.

An example embodiment of the invention includes an apparatus comprising:

at least one processor;

at least one memory including computer program code;

the at least one memory and the computer program code configured to, with the at least one processor, cause the apparatus at least to:

receive a temporary release message from a control node that the apparatus serves, indicating temporary release of a portion of resources allocated to the control node by the apparatus;

periodically obtain an indication from the control node whether the release is still valid; and return the temporarily released resources to the control node when the release is no longer valid.

An example embodiment of the invention includes an apparatus comprising:

the at least one memory and the computer program code configured to, with the at least one processor, cause the apparatus at least to:

transmit at least a portion of the resources released by the control node, to one or more other network controllers; and receive a return of the released resources from the one or more other network controllers, when the apparatus transmits a command to the one or more other network controllers to return the released resources.

An example embodiment of the invention includes an apparatus comprising:

at least one processor;

at least one memory including computer program code;

the at least one memory and the computer program code configured to, with the at least one processor, cause the apparatus at least to:

receive resources from another network controller, which were temporarily released by a control node served by the other network controller; and return the released resources to the other network controller, when the apparatus receives a command from the other network controller to return the released resources.

An example embodiment of the invention includes an apparatus comprising:

at least one processor;

at least one memory including computer program code;

the at least one memory and the computer program code configured to, with the at least one processor, cause the apparatus at least to:

receive resources from another network controller, which were temporarily released by a control node served by the other network controller;

calculate a new resource allocation to a control node of the apparatus without changing an existing allocation of a coexistence set of the control node;

allocate a new resource allocation to the control node with an indication to prohibit making a further a resource release; and return the released resources to the other network controller, when the apparatus receives a command from the other network controller to return the released resources.

An example embodiment of the invention includes a computer program product comprising computer executable program code recorded on a computer readable, non-transitory storage medium, the computer executable program code comprising:

code for receiving by a control node of a wireless network, an allocation of resources and an indication of allowance to release resources temporarily from a network controller serving the control node; and code for transmitting by the control node to the network controller, a message indicating temporary release of a portion of the allocated resources.

An example embodiment of the invention includes a computer program product further comprising:

code for periodically indicating by the control node to the network controller, whether the release is still valid; and code for receiving by the control node, a return of the temporarily released resources from the network controller, when the release is no longer valid.

An example embodiment of the invention includes a computer program product comprising computer executable program code recorded on a computer readable, non-transitory storage medium, the computer executable program code comprising:

code for receiving by a network controller, a temporary release message from a control node that it serves, indicating temporary release of a portion of resources allocated to the control node by the network controller;

code for periodically obtaining an indication from the control node whether the release is still valid; and code for returning the temporarily released resources to the control node when the release is no longer valid.

An example embodiment of the invention includes a computer program product further comprising:

code for transmitting by the network controller, at least a portion of the resources released by the control node, to one or more other network controllers; and code for receiving by the network controller, a return of the released resources from the one or more other network controllers, when the network controller transmits a command to the one or more other network controllers to return the released resources.

An example embodiment of the invention includes a computer program product comprising computer executable program code recorded on a computer readable, non-transitory storage medium, the computer executable program code comprising:

code for receiving by a network controller, resources from another network controller, which were temporarily released by a control node served by the other network controller; and code for returning by the network controller, the released resources to the other network controller, when the network controller receives a command from the other network controller to return the released resources.

An example embodiment of the invention includes a computer program product comprising computer executable program code recorded on a computer readable, non-transitory storage medium, the computer executable program code comprising:

code for receiving by a network controller, resources from another network controller, which were temporarily released by a control node served by the other network controller;

code for calculating by the network controller, a new resource allocation to a control node of the network controller without changing an existing allocation of a coexistence set of the control node; and code for allocating a new resource allocation to the control node with an indication to prohibit making a further a resource release;

code for returning by the network controller, the released resources to the other network controller, when the network controller receives a command from the other network controller to return the released resources.

The example embodiments of the invention provide efficient radio spectrum use and resource coexistence management in RF white spaces.

DESCRIPTION OF THE FIGURES

FIG. 1C is an example system architecture according to an example embodiment of the invention of FIG. 1A, which illustrates the network controller or coexistence manager CM_A, transmitting reconfiguration command temporary release entitlement message 211 of FIG. 2A, to coexistence enabler 115 of white space object A2, in an example embodiment of the invention.

FIG. 1D is an example system architecture according to an example embodiment of the invention of FIG. 1A, which illustrates the coexistence enabler 115 of white space object A2 transmitting to the network controller or coexistence manager CM_A, temporary release message 212 of FIG. 2B, in an example embodiment of the invention.

FIG. 1E is an example system architecture according to an example embodiment of the invention of FIG. 1A, which illustrates the network controller or coexistence manager CM_A, transmitting validity check message 213 of FIG. 2C, to coexistence enabler 115 of white space object A2, in an example embodiment of the invention.

FIG. 1F1 is an example system architecture according to an example embodiment of the invention of FIG. 1A, which illustrates the network controller or coexistence manager CM_A, transmitting CM-TO-ANOTHER-CM temporary release message 214 of FIG. 2D, to coexistence manager CM_C, in an example embodiment of the invention.

FIG. 1F2 is an example system architecture according to an example embodiment of the invention of FIG. 1A, which illustrates the network controller or coexistence manager CM_A, transmitting a reconfiguration command message, to a second coexistence enabler 115' of a second white space object A2' that it serves, in an example embodiment of the invention.

FIG. 1H is an example system architecture according to an example embodiment of the invention of FIG. 1A, which illustrates coexistence enabler 115 of white space object A2 transmitting to the network controller or coexistence manager CM_A, termination message 215 of FIG. 2E, in an example embodiment of the invention.

FIG. 1I is an example system architecture according to an example embodiment of the invention of FIG. 1A, which illustrates the network controller or coexistence manager CM_A, transmitting CM-TO-ANOTHER-CM termination message 216 of FIG. 2F, to coexistence manager CM_C, in an example embodiment of the invention.

FIG. 1J1 is an example system architecture according to an example embodiment of the invention of FIG. 1A, which illustrates the network controller or coexistence manager CM_C, transmitting reconfiguration command terminate temporary resources 211" similar to FIG. 2A to coexistence enabler 111 of white space object C2, in an example embodiment of the invention.

FIG. 1J2 is an example system architecture according to an example embodiment of the invention of FIG. 1A, which illustrates the network controller or coexistence manager CM_C, transmitting reconfiguration command terminate temporary resources 211" similar to FIG. 2A to a second coexistence enabler 111' of a second white space object C2' that it serves, in an example embodiment of the invention.

FIG. 2A is an example message format of the reconfiguration command temporary release entitlement message 211, in an example embodiment of the invention.

FIG. 2B is an example message format of the temporary release message 212, in an example embodiment of the invention.

FIG. 2C is an example message format of the validity check message 213, in an example embodiment of the invention.

FIG. 2D is an example message format of the CM-TO-ANOTHER-CM temporary release message 214, in an example embodiment of the invention.

FIG. 2E is an example message format of the termination message 215, in an example embodiment of the invention.

FIG. 2F is an example message format of the CM-TO-ANOTHER-CM termination message 216, in an example embodiment of the invention.

FIG. 2G is an example message format of the reconfiguration command message to a second coexistence enabler of a second white space object that the CM serves, in an example embodiment of the invention.

FIG. 6A is an example flow diagram of operational steps in a control node transmitting to a serving network controller, a temporary release message indicating resources that were kept by the control node, according to an embodiment of the present invention.

FIG. 6C is an example flow diagram of operational steps in a network controller that receives resources from another network controller, in response to receiving a temporary release message, according to an embodiment of the present invention.

DISCUSSION OF EXAMPLE EMBODIMENTS OF THE INVENTION

Figure 1A:
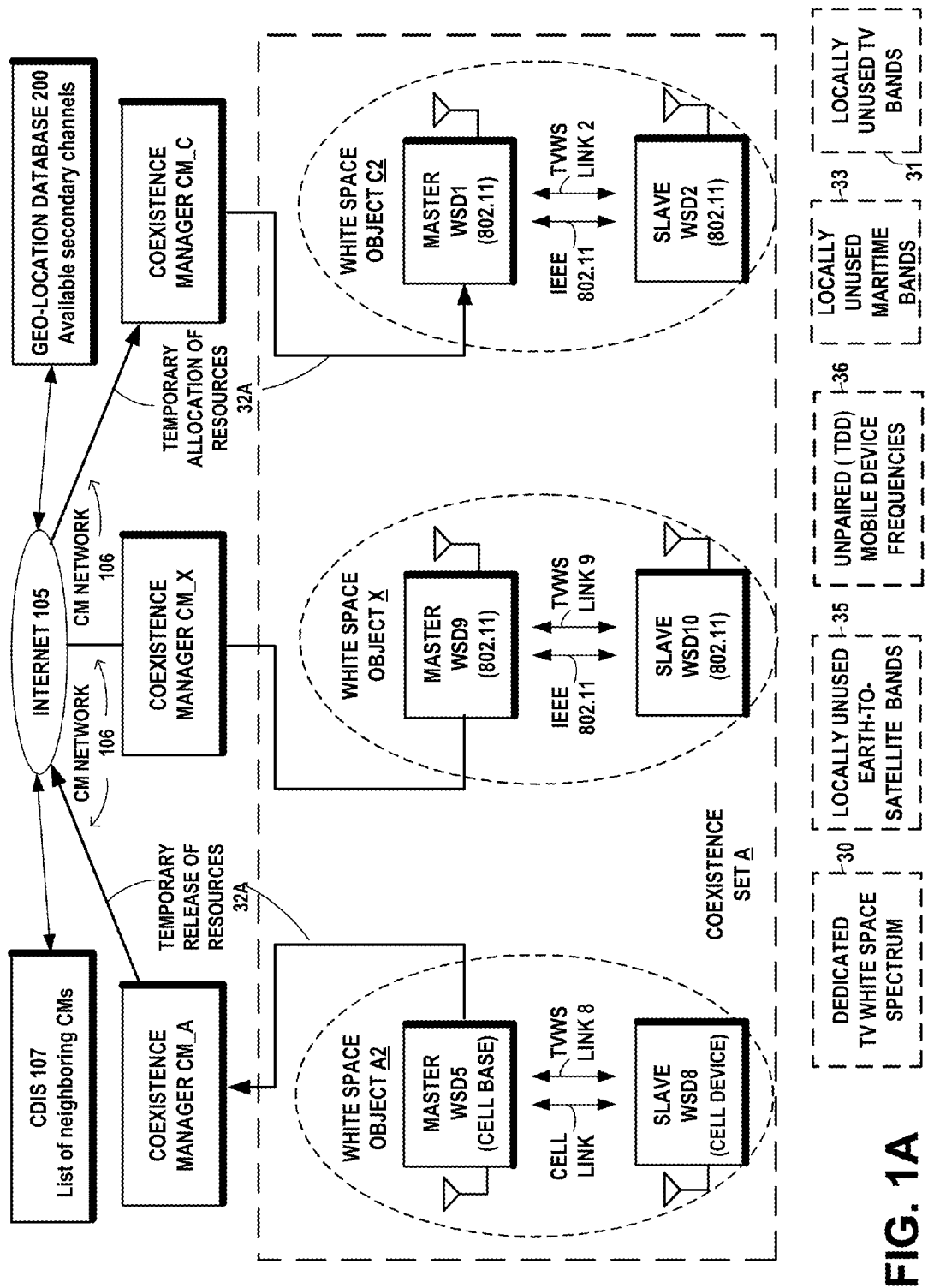
FIG. 1A is an example system architecture according to an example embodiment of the invention, showing three network controllers or coexistence managers CM_A, CM_C and CM_X serving three respective White Space Objects (WSOs), the first WSO A2, the second WSO C2, and the third WSO X that are neighbors in a coexistence set, in an example embodiment of the invention.

In the United States, the FCC has opened up 300 MHz to 400 MHz of white spaces for unlicensed use that became unused after a federally mandated transformation of analog TV broadcasting to digital TV broadcasting. However, the FCC has prohibited unlicensed use of white spaces from interfering with existing licensed uses, including digital TV stations, low power TV stations, cable TV headends, and sites where low power wireless microphones are used.

The FCC has defined the regulation of white spaces in *Second Memorandum Opinion and Order*, FCC 10-174, Sep. 23, 2010 for secondary white space devices (WSD). In Europe, the European Conference of Postal and Telecommunications Administrations (CEPT) has defined initial requirements in ECC Report 159: *Technical and Operational Requirements for the Possible Operation of Cognitive Radio Systems in the 'White Spaces' of the Frequency Band 470-790 MHz*, January 2011.

Various proposals have been made for unlicensed use of the white spaces left by the termination of analog TV, for example rural broadband deployment, auxiliary public safety communications, educational and enterprise video conferencing, personal consumer applications, mesh networks, security applications, municipal broadband access, enhanced local coverage and communications, fixed backhaul, and sensor aggregation for smart grid meter reading.

Coexistence standards are currently being developed to enable two or more independently operated wireless networks or devices using any radio technologies adapted for TV white space frequency bands, to access the same TV white space frequency band in the same location without mutual interference.

The IEEE 802.19 Working Group is currently defining coexistence rules for heterogeneous secondary networks. An example embodiment of the invention enables coexistence between heterogeneous secondary networks and coexistence between secondary networks and primary networks that are required to be protected. Primary networks and users are incumbent users of the selected frequency band that have a form of priority access to the band. Primary networks include networks operating in FCC licensed bands, such as for commercial radio and television broadcasting. Secondary networks and users are allowed to use the selected band only if there are resources that are not used by the primary users. Secondary networks include any broadband networks operating unlicensed in the TV white spaces (TVWS) and using transmission devices that comply with the FCC requirements for TV Band Devices (TVBDs). Fixed TVBD devices must include geo-location and query a database to determine allowed channels. Portable master TVBD devices must be able to access geo-location data or include a spectrum sensing capability to identify TV and wireless microphone signals.

The FCC has adopted rules to allow unlicensed radio transmitters to operate in the broadcast television spectrum at locations where that spectrum is not being used by licensed broadcasters. The FCC required the use of geo-location to establish the location of the unlicensed transmitter and a database of TV bands use by licensed broadcasters organized by their geographic coverage areas, to enable the unlicensed transmitter to know where local TV band white spaces may be available. Alternatively, the FCC required the use of spectrum sensors in the unlicensed transmitter to detect the presence of the incumbent, primary TV broadcaster's signal in the local TV band white space to enable the unlicensed transmitter to immediately relinquish using the band. A primary user in such a local TV band white space would be an incumbent TV broadcaster licensed to operate in that band, but in those geographic areas where there are no licensed incumbent TV broadcasters in operation, other unlicensed secondary users may make use of that band.

Other spectrum white spaces may be locally unused in certain geographic areas, such as the frequency allocations from maritime radio in landlocked areas remote from the sea. A primary user in such a maritime radio band would be a maritime radio licensed to operate in that band, but in those geographic areas where there are no licensed maritime radios in operation, other unlicensed secondary users may make use of that band. Similarly, locally unused spectrum white spaces may be present in certain geographic locations, such as the frequency allocations from 2.025 GHz to 2.110 GHz for earth stations to transmit to communications satellites, in areas remote from such earth stations. A primary user in such a satellite earth station radio band would be a satellite earth station licensed to operate in that band, but in those geographic areas where there are no satellite earth stations in operation, other unlicensed secondary users may make use of that band.

Active coexistence between secondary networks using the RF white spaces may require new techniques for fairly sharing the available bandwidth among different heterogeneous secondary networks and accord the required preference for primary users of the band. Such new techniques may require some form of communication between the secondary networks to enable a fair usage of the local spectrum.

A network controller or coexistence manager CM is the main decision maker of the coexistence system. It discovers and solves the coexistence conflicts of the networks operating in the same area. A CM serves one or more networks. Depending on the deployment, it resides either in a TVBD or in the network entity. In independent networks it may reside in a TVBD. The CM discovers the interfering networks and their CMs, and shares information with other CMs. Based on the collected information it reconfigures the operation of its own networks, but also performs resource reallocation for those WSOs in a coexistence set the CM is allowed to, as needed.

In the United States, the WSD may operate as a master WSD of a network of associated slave WSD devices. For example, the master WSD may be an access point or base station. The master WSD is expected to access the geo-location database (DB) on behalf of its slave WSD devices, to discover the available spectrum that is not used by the incumbent users, for example, TV broadcasters.

The following discussion employs terms that are defined as follows:
  WSO (White Space Object)=TVBD network or device.
  Coexistence set=neighbors.
    Coexistence set is a set of WSOs otherwise referred to as neighbors.

Each coexistence manager (CM) determines and maintains a coexistence set for each WSO that it serves. A WSO's coexistence set comprises of other WSOs that may interfere the WSO or that the WSO may interfere with.

Coexistence set element=neighbor TVBD network or device

A WSO that belongs to a coexistence set

Coexistence set extension=Limiting networks (the neighbors of neighbors)

Each CM has a coexistence set extension for each coexistence set it has (one per WSO the CM serves). The extension comprises those WSOs that belong to the coexistence sets of WSOs in one's own coexistence set, but that do not belong to the one's own coexistence set.

Control node=coexistence enabler (CE)

Network controller=coexistence manager (CM)

In accordance with an example embodiment of the invention, small and frequent changes may be accommodated in resource needs in the resource allocations given to the WSOs. Resource needs of a wireless network (a WSO) may vary frequently due to changes in number of connected client devices, active services per client devices, etc.

In accordance with an example embodiment of the invention, a coexistence enabler (CE) is allowed at any moment, to temporarily release resources that were previously allocated to it and its WSO. In accordance with an example embodiment of the invention, the coexistence manager (CM) that serves the releasing CE, may temporarily release the released resources and make them available to other CMs for the period that the releasing CE does not need them.

In accordance with an example embodiment of the invention, a CE may communicate the release and its temporary nature to the CM that serves it. In accordance with an example embodiment of the invention, the serving CM may periodically check the releasing CE (at least once per a pre-determined interval) as to whether the release is still valid. In accordance with an example embodiment of the invention, the serving CM may return the temporarily released resources to the releasing CM upon request of the CE.

In accordance with an example embodiment of the invention, a CM that serves a CE that has temporarily released resources, makes the released resources temporarily available to other CMs. In accordance with an example embodiment of the invention, the serving CM may command the other CMs to stop using the temporarily released resources upon the expiration of a condition required by the CE that released the resources.

FIG. 1A is an example system architecture according to an example embodiment of the invention, showing three network controllers or coexistence managers CM_A, CM_C and CM_X serving three respective White Space Objects (WSOs), the first WSO A2, the second WSO C2, and the third WSO X that are neighbors in a coexistence set, in an example embodiment of the invention.

The first WSO A2 includes a network of white space devices (WSDs) WSD5 and WSD8. The second WSO C2 includes a second network of WSDs WSD1 and WSD2.

Example white space spectrum in the operating area of a WSD device include dedicated TV white space spectrum 30, locally unused TV bands 31, locally unused maritime bands 33, locally unused satellite bands 35, and locally unpaired (TDD) mobile device frequencies.

In an example embodiment of the invention, a network of distributed coexistence managers CM_A, CM_C, and CM_X may communicate with one another over the Internet 105 and CM network 106. The white space object (WSO) A2 may transmit to the network controller or coexistence manager CM_A, a temporary release of resources 32A. The coexistence manager CM_A may forward over the CM network 106 to coexistence manager CM_C all or a portion of the temporary release of resources 32A. The coexistence manager CM_C may, in turn, transmit a reconfiguration command to white space object (WSO) A2 to convey all or a portion of the temporary release of resources 32A.

FIG. 1A also shows three non-limiting example white space spectra locally unused by licensed primary users of their respective spectrum white spaces, which may be used by the master WSD1 or slave WSD2, operating as unlicensed secondary users. TV band white space 31 is locally unused by licensed TV broadcasters. Maritime radio band 33 is locally unused by licensed maritime band radios. Earth station-to-satellite radio band 35 is locally unused by licensed earth station radios. A non-limiting example of a TV band white space 31 locally unused by licensed TV broadcasters is the 174-204 MHz band, representing the local absence of broadcast VHF TV channels 7, 8, 9, 10, and 11. If there were a local absence of licensed broadcasters in TV band white space 31, on VHF TV channels 7, 8, 9, 10, and 11, which would otherwise interfere with the master WSD1 or slave WSD2, then they could operate as unlicensed secondary users and make use of TV band white space 31. If either master WSD1 or slave WSD2 were to detect a signal transmitted from a neighboring TV broadcaster in band 31, then they would have to relinquish their use of the TV band white space 31 and make a resource request, in accordance with an example embodiment of the invention. Non-limiting examples of white space spectra are available in many parts of the electromagnetic spectrum. For example, white space spectra are available for personal/portable devices in the UHF portion of the spectrum.

A maritime radio operates in a number of licensed frequency allocations and is a primary user in the maritime radio band 33. If there were no licensed maritime radios in operation that would interfere with the master WSD1 or slave WSD2, then they could operate as unlicensed secondary users and make use of maritime radio band 33. If either master WSD1 or slave WSD2 were to detect a signal transmitted from a neighboring maritime radio, then they would have to relinquish their use of the maritime band 33 and make a resource request, in accordance with example embodiments of the invention.

A satellite earth station transmits to satellites in licensed frequency allocations from 2.025 GHz to 2.110 GHz and is a primary user in the earth-to-satellite band 35. If there were no licensed earth station radios in operation that would interfere with the master WSD1 or slave WSD2, then they could operate as unlicensed secondary users and make use of earth-to-satellite radio band 35. If either master WSD1 or slave WSD2 were to detect a signal transmitted from a neighboring earth station radio, then they would have to relinquish their use of the earth-to-satellite band 35 and make a resource request, in accordance with example embodiments of the invention.

Figure 7:
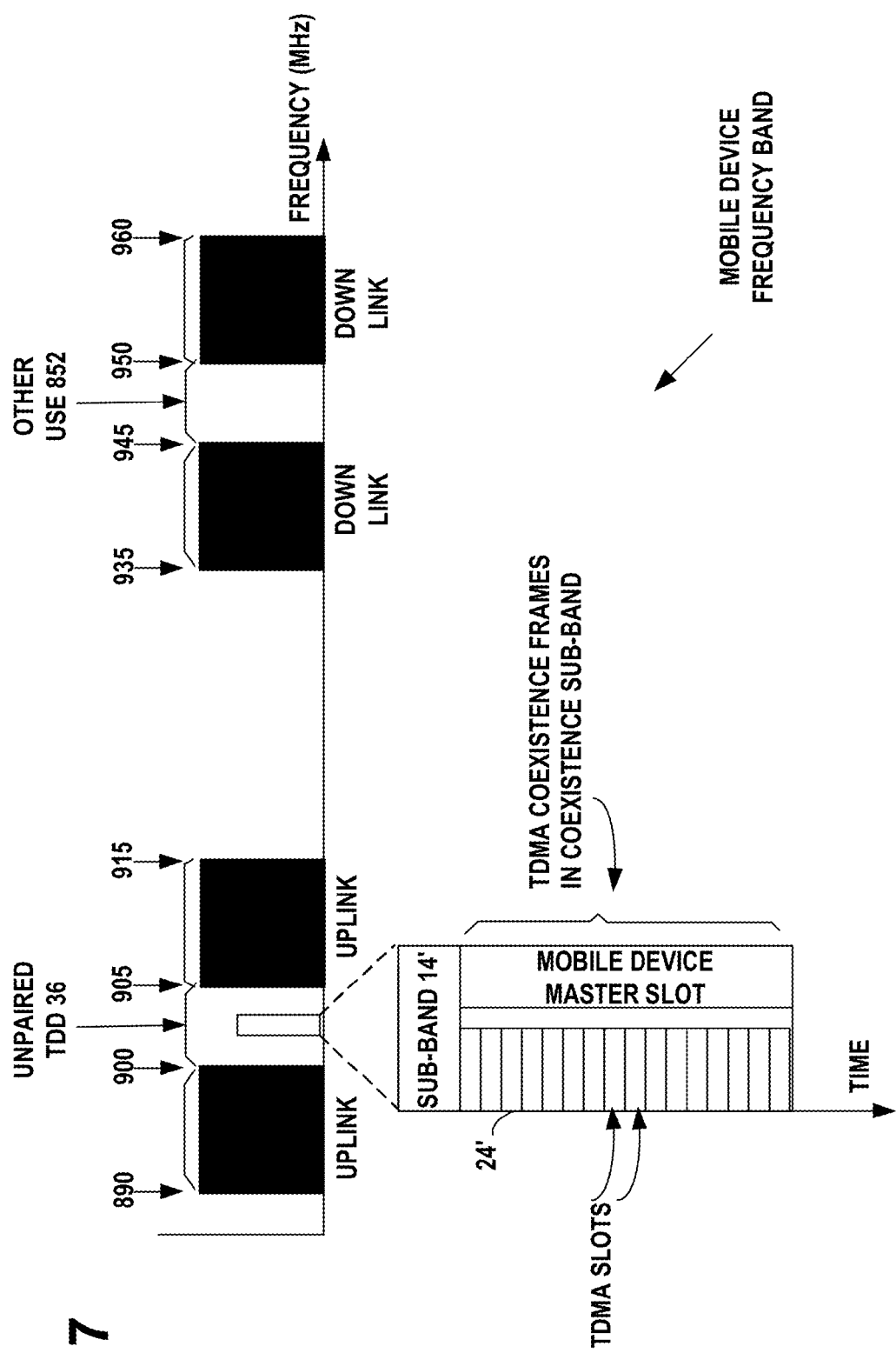
FIG. 7 is an example frequency band diagram illustrating an example TDMA coexistence frame in a sub-band in an unpaired time domain duplex frequency white space in the uplink portion of a mobile device communications frequency band, according to an example embodiment of the invention.

Also shown in FIG. 1A is a second master WSD device WSD5 and its associated slave WSD8 in the second master WSD5's operation area. The master WSD5 uses a cellular 3rd Generation Partnership Project (3GPP) standard, such as Third-Generation (3G), Wideband Code Division Multiple Access (W-CDMA), High Speed Packet Access (HSPA), Long Term Evolution (LTE), LTE Advanced (LTE-A), or International Mobile Telecommunications Advanced (IMT- A), for its normal communications on the cell links, but it is capable of communicating in white space spectrum on TVWS links 6, 7, and 8. The returned information from the geo-location database enables the operation in the white space spectrum, of both the master WSD5 and its associated slave WSD8 that are within the master WSD5's operational area. FIG. 7 shows an example TDMA coexistence frame 24' in sub-band 14' in the unpaired time domain duplex frequency white space 36 in the uplink portion of the mobile device frequency band, which may be used by the cell base master device WSD5 and the cell slave device WSD8 in FIG. 1A. TVWS may be used, for examine, in carrier aggregation, where it is available, in addition to licensed media.

Similar examples include local area technologies implemented for example, cellular technologies for small cell operations such as hotspots, pico cells, femto cells, home nodes such as Home Node B (HNB), Home eNodeB (HeNB) and the like. Further, integrated local nodes of secondary networks may consist of 3GPP technologies combined with the IEEE technologies, for example LTE Home eNodeB (LTE HeNB) with Wi-Fi.

Figure 1B:
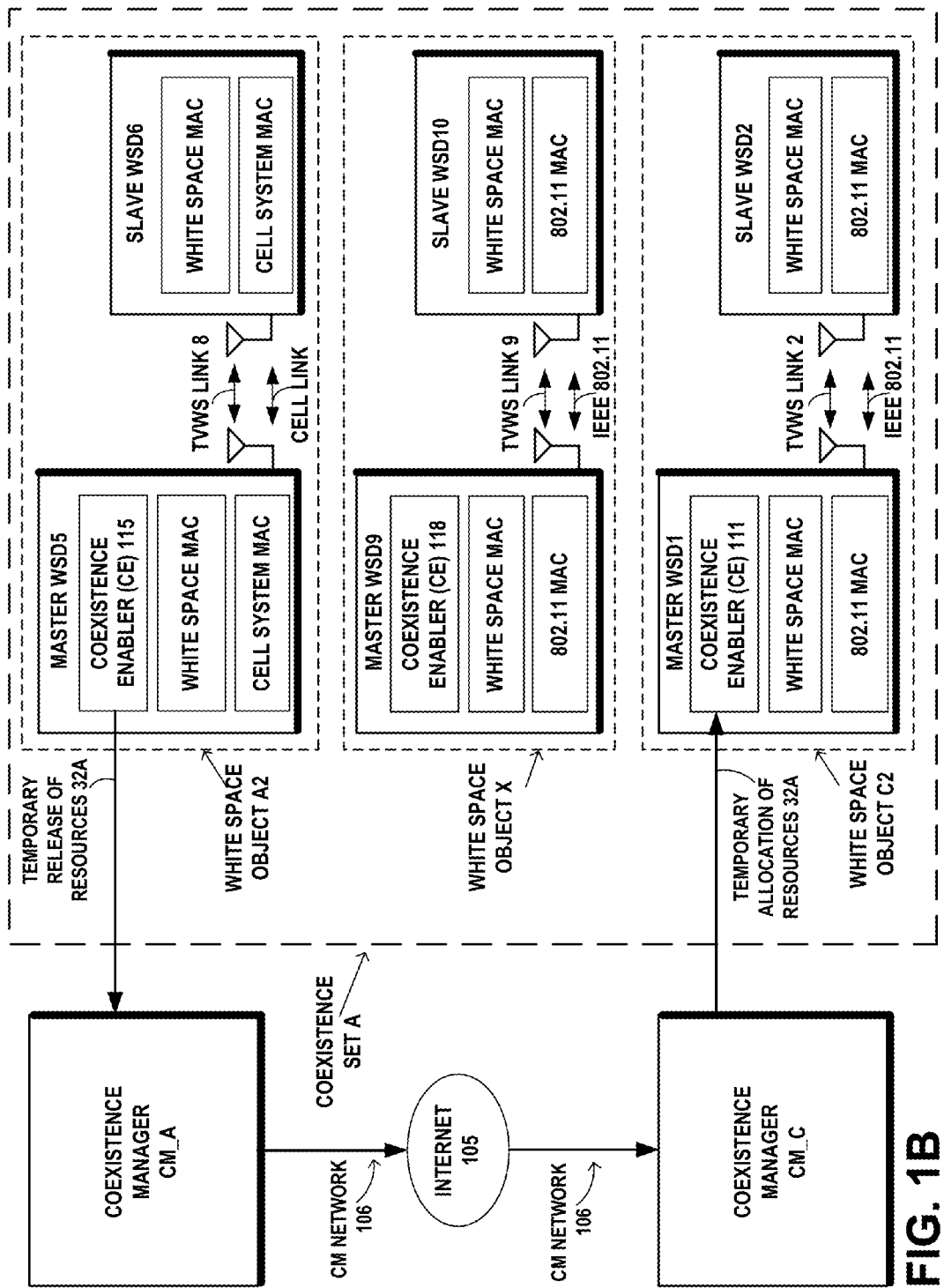
FIG. 1B is an example system architecture according to an example embodiment of the invention, showing the network controllers or coexistence managers CM_A, CM_C and CM_X serving three respective White Space Objects (WSOs), WSO A2, WSO C2, and WSO X that are neighbors in a coexistence set, in an example embodiment of the invention.

FIG. 1B is an example system architecture according to an example embodiment of the invention, showing the network controllers or coexistence managers CM_A, CM_C and CM_X serving three respective White Space Objects (WSOs), WSO A2, WSO C2, and WSO X that are neighbors in a coexistence set A, in an example embodiment of the invention.

In an example embodiment of the invention, a network of distributed coexistence managers CM_A and CM_C may communicate with one another over the Internet 105. According to an example embodiment of the invention, the control node or coexistence enabler 111 in the master WSD1 may communicate over the Internet 105 with the TVWS coexistence manager CM_C. According to an alternate example embodiment of the invention, the control node or coexistence enabler 111 in the master WSD1 may be collocated with the TVWS coexistence manager CM_C. The coexistence enabler 115 in the master WSD5 may communicate over the Internet 105 with the TVWS coexistence manager CM_A. The distributed coexistence managers CM_A and CM_C may communicate over the Internet 105, in an example embodiment of the invention. Master WSD1 may be registered through the control node or coexistence enabler 111 to the network controller or coexistence manager CM_C. Master WSD5 may be registered through the control node or coexistence enabler 115 to the network controller or coexistence manager CM_A.

The coexistence enabler 111 may obtain information required for coexistence from a traffic network or device representing it. This may include configuration and control of measurements. Also, the coexistence enabler 111 may provide reconfiguration commands and control information to the master WSD1, corresponding to coexistence decisions received from coexistence manager CM_C. The coexistence manager CM_A is responsible for discovery of Coexistence Managers (CM)s CM_C managing neighboring wireless networks, for example, and coexistence related information may be exchanged with them. The coexistence manager CM_A or CM_C may have the needed information to make decisions of resource sharing among the Coexistence Managers (CM)s managing neighboring wireless networks.

The coexistence manager CM_C handles resource requests from the coexistence enabler 111 in master WSD1. The coexistence manager CM_A handles resource requests from the coexistence enabler 115 in master WSD5. The master WSD1 includes IEEE 802.11 MAC and PHY to communicate over its network. The master WSD5 cell system includes a cellular 3GPP standard MAC and PHY to communicate over its network. The coexistence enablers 111 and 115 in master WSD1 and in master WSD5 send resource requests to the respective coexistence managers CM_C and CM_A.

The example system architecture of FIG. 1B shows the coexistence manager CM_C receiving a resource request from the coexistence enabler 111 in master WSD1. The coexistence manager CM_C has received Spectrum sensing results and network parameters from the coexistence enabler 111 in master WSD1. Network parameters may include specific user requirements (user load, QoS, priority, etc), aggregate spectral efficiency, etiquette (first come, first served, etc.), and user or network policies. The coexistence manager CM_C accesses a geo-location database 200 in FIG. 1A to obtain available secondary channels in the TV band white space. The coexistence manager CM_C accesses the coexistence network element coexistence discovery and information server (CDIS) 107 in FIG. 1A to obtain potential neighbor networks' addresses. The coexistence manager CM_C processes this data in conjunction with Spectrum maps, Operational parameters, and Time base sync, to determine a resource reallocation for the coexistence enabler 111 in master WSD1. The coexistence manager CM_C then sends to the coexistence enabler 111 in master WSD1 the resource reallocation, including Operational parameters, Quiet period parameters, Spectrum sensing strategy, and/or Time base sync. The coexistence enabler 111 in master WSD1 then controls at least one of the medium access control (MAC) and the physical layer (PHY) and the Radio resource Control (RRC) and the Radio Resource Management (RRM) to communicate in channels in the TV white spaces band reallocated by the coexistence manager CM_C, without interference from other networks sharing the same white space channels. A similar operation may be carried out by the coexistence manager CM_A in conjunction with the coexistence enabler 115 in master WSD5. A network of distributed coexistence managers CM_C and CM_A may communicate with one another over the Internet 105.

FIG. 1C is an example system architecture according to an example embodiment of the invention of FIG. 1A, which illustrates the network controller or coexistence manager CM_A, transmitting reconfiguration command temporary release entitlement message 211 of FIG. 2A, to control node or coexistence enabler (CE) 115 of white space object A2, in an example embodiment of the invention.

The control node or coexistence enabler (CE) receives an allocation of resources from the network controller or coexistence manager (CM) serving the control node.

In an example embodiment of the invention, a CE that is served by a CM and that has subscribed to the management service, and that has received a reconfiguration command from the serving CM with operating parameters (i.e. resource allocation) has means to release some of the resources allocated to it and its WSO in temporary manner.

In an example embodiment of the invention, the serving CM has means to manage the CEs it serves with respect to whether the CEs are entitled to release resources in temporary manner. In an example embodiment of the invention, each reconfiguration command from a CM to a CE it serves in the coexistence management service may contain an indication whether the CE is entitled to release the given resources in temporary manner. Only a CE that has been entitled to release resources in the previous reconfiguration command from its CM may release some of the resources using the methods defined earlier in this section.

FIG. 1D is an example system architecture according to an example embodiment of the invention of FIG. 1A, which illustrates the control node or coexistence enabler (CE) 115 of white space object A2 transmitting to the network controller or coexistence manager CM_A, temporary release message 212 of FIG. 2B, in an example embodiment of the invention.

The control node or coexistence enabler (CE) transmits to the network controller or coexistence manager (CM), a temporary release message indicating resources that were kept by the control node after a temporary release.

In an example embodiment of the invention, the CE may send a message to the serving CM at any time after the reconfiguration message to indicate that the CE and its WSO take only a portion of the given resources in use and make the rest of the resources available for others in temporary manner. In an example embodiment of the invention, the message may be similar to the response message sent as a response to a reconfiguration command message. The response message may have at least a field with which the CE can indicate that the new parameters are due to temporary release of some resources allocated to the CE and its WSO. In an example embodiment of the invention, there may be a new message type for a CE to indicate temporary release of resources. In an example embodiment of the invention, regardless of the message type the release message from a CE to the CM serving it may contain operating parameters of the WSO associated to the CE after the temporary release.

FIG. 1E is an example system architecture according to an example embodiment of the invention of FIG. 1A, which illustrates the network controller or coexistence manager CM_A, transmitting validity check message 213 of FIG. 2C, to control node or coexistence enabler (CE) 115 of white space object A2, in an example embodiment of the invention.

The control node or coexistence enabler (CE) periodically indicates to the network controller or coexistence manager (CM), whether the release is still valid. In an example embodiment of the invention, the termination message 215 of FIG. 2E may be a response message to the validity check message 213 of FIG. 2C. The response to the validity check message 213 may be either "release is still valid" or "terminate the release". The control node or coexistence enabler (CE) may make this response/indication only when the network controller or coexistence manager (CM) has transmitted the validity check message 213.

In an example embodiment of the invention, a CM that serves a CE and that receives from the CE a temporary release of resources allocated to the CE and its WSO, takes responsibility for maintaining the temporarily released resources on behalf of the CE.

In an example embodiment of the invention, the serving CM has a timer for each of the CEs it serves in the management service. The timer is reset to a pre-determined value representing the release validity period and is started to decrement upon receiving a release request message from the CE. The serving CM may successfully complete a validity check request-response message exchange with the releasing CE at least once per the release validity period. The timer may be maintained as long as the release is valid. The timer may be reset to the pre-determined value representing the release validity period and restarted to decrement upon reception of a response message from the releasing CE indicating a continuation of the release.

The control node receives a return of the temporarily released resources from the network controller, when the release is no longer valid.

In an example embodiment of the invention, the control node periodically indicates to the network controller, whether the release is still valid, in response to receiving a request or status query from the network controller.

FIG. 1F1 is an example system architecture according to an example embodiment of the invention of FIG. 1A, which illustrates the network controller or coexistence manager CM_A, transmitting CM-TO-ANOTHER-CM temporary release message 214 of FIG. 2D, to network controller or coexistence manager CM_C, in an example embodiment of the invention.

In an example embodiment of the invention, the serving CM communicates its CE's resources after a temporary release. It is then up to receiving CM to calculate what kind of resources it can have according to reduced resources of the releasing neighbor CE, without changing the resource allocation of any WSOs in the coexistence set of the WSO receiving temporary resources. In another example embodiment of the invention, temporarily released resources may be communicated to receiving CMs.

In an example embodiment of the invention, this happens with a message similar to the one with which the CM communicates operating parameters of the CE that the CM serves. In an example embodiment of the invention, the message may contain a field with which the serving CM may indicate whether the operating parameters are due to a temporary resource release. In an example embodiment of the invention, the message may allow the serving CM to indicate the operating parameters of a WSO associated to a CE and whether the operating parameters are due to temporary resource release. In an example embodiment of the invention, the same message may be used by the serving CM also to indicate termination of the temporary resource release. Such a message may be sent by the serving CM when the releasing CE has declined to continue the release and when the release timer has expired.

The network controller receives a temporary release message from a control node that it serves, indicating resources that were kept by the control node after a temporary release. The network controller transmits at least a portion of the resources released by the control node, to one or more other network controllers. The one or more other network controller receives resources from the originating network controller, which were temporarily released by a control node served by the originating network controller.

FIG. 1F2 is an example system architecture according to an example embodiment of the invention of FIG. 1A, which illustrates the network controller or coexistence manager CM_A, transmitting a reconfiguration command message 211' of FIG. 2G, to a second control node or coexistence enabler (CE) 115' of a second white space object A1 that CM_A serves, in an example embodiment of the invention.

In an example embodiment of the invention, if the CM_A allocates at least a portion of the temporarily released resources to another CE 115' of another WSO A1 that CM_A serves, CM_A may send a reconfiguration command message 211' of FIG. 2G to the other CE 115' indicating the additional resources. In an example embodiment of the invention, the message may be a reconfiguration command message that contains a field with which the CM indicates the operating parameters and whether the parameters are due to temporarily released resources. The indication that the parameters are due to temporarily released resources may be to prohibit the other CE 115' from further releasing the temporary resources. In an example embodiment of the invention, this indication may be the same as the one with which the CM indicates whether the original CE 115 is entitled to release the allocated resources or not.

In an example embodiment of the invention, the CM_A may send a reconfiguration command to the other CE 115' indicating that both a portion or all of the temporarily released resources are provided and also that free/released resources from the network may be provided, and also that resources still reserved for the network may be provided.

Figure 1G:
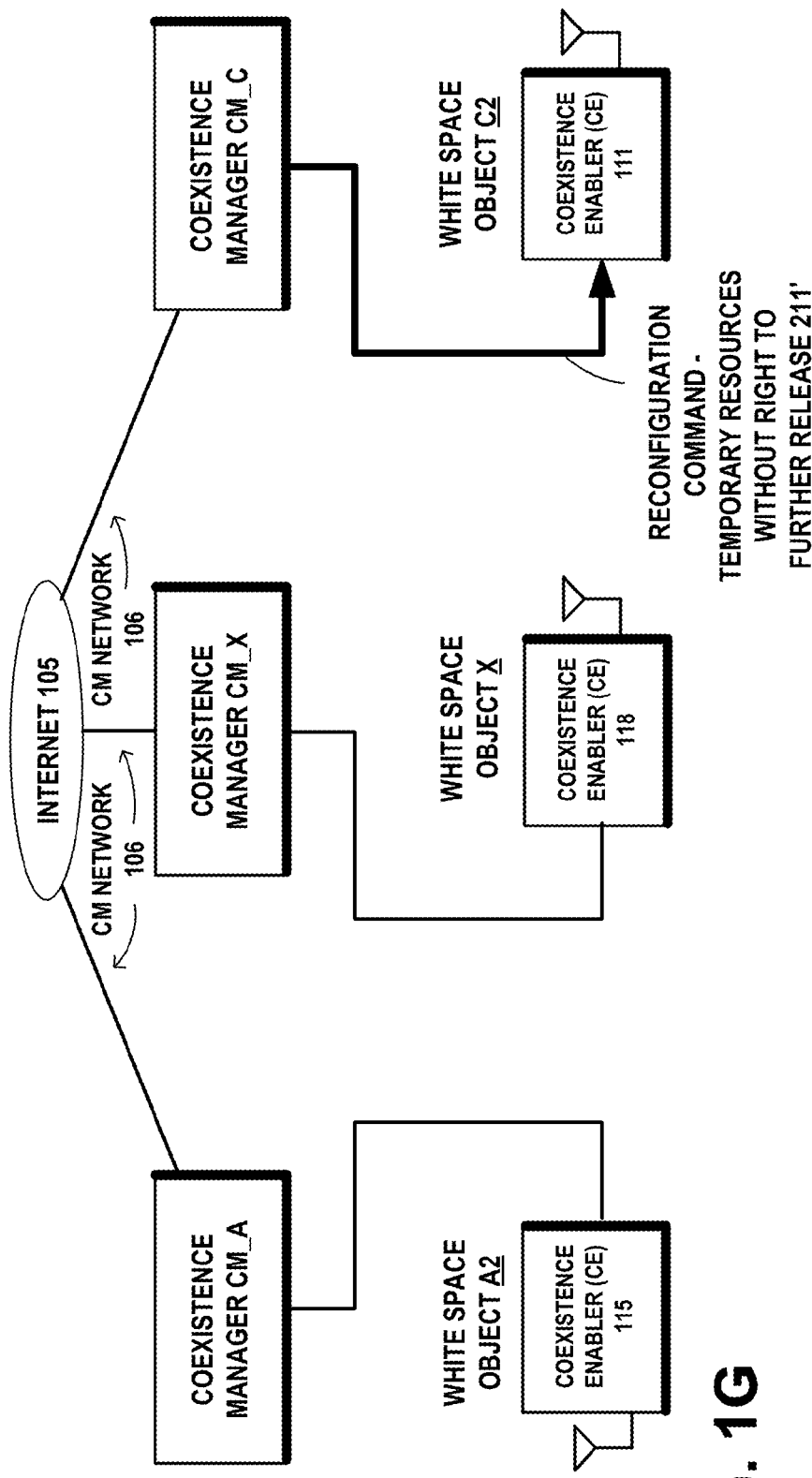
FIG. 1G is an example system architecture according to an example embodiment of the invention of FIG. 1A, which illustrates the network controller or coexistence manager CM_C, transmitting reconfiguration command temporary resources without right to further release 211' similar to FIG. 2A, to coexistence enabler 111 of white space object C2, in an example embodiment of the invention.

FIG. 1G is an example system architecture according to an example embodiment of the invention of FIG. 1A, which illustrates the network controller or coexistence manager CM_C, transmitting reconfiguration command—temporary resources without right to further release 211' similar to FIG. 2A, to control node or coexistence enabler (CE) 111 of white space object C2, in an example embodiment of the invention.

In an example embodiment of the invention, a CM that receives from another CM a message indicating existence of temporarily released resources, may take the resources temporarily for use by a WSO associated to a CE it serves.

In an example embodiment of the invention, if the CM allocates at least a portion of the temporarily released resources to one of the WSOs associated to a CE it serves, it may send a message to the CE indicating the additional resources. In an example embodiment of the invention, the message may be a reconfiguration command message that contains a field with which the CM indicates the operating parameters and whether the parameters are due to temporarily released resources. The indication that the parameters are due to temporarily released resources may be to prohibit the CE from further releasing the temporary resources. In an example embodiment of the invention, this indication may be the same as the one with which the CM indicates whether the CE is entitled to release the allocated resources or not.

In an example embodiment of the invention, the network controller or coexistence manager CM_C in FIG. 1F1, has received resources in the CM-TO-ANOTHER-CM temporary release message 214 from network controller or coexistence manager CM_A, which were temporarily released by the control node or coexistence enabler (CE) 115 served by the network controller CM_A.

In an example embodiment of the invention, the network controller CM_C in FIG. 1G, calculates a new resource allocation to the control node or coexistence enabler (CE) 111 of the network controller CM_C, without changing an existing allocation of a coexistence set of the control node 111.

In an example embodiment of the invention, the network controller CM_C in FIG. 1G, allocates the new resource allocation to the control node 111 with an indication to prohibit making a further a resource release.

In an example embodiment of the invention, the network controller CM_C in FIG. 1J1, sends the reconfiguration command-terminate temporary resources message 211" to control node or coexistence enabler 111, to thereby return the released resources to the network controller CM_A, when the network controller CM_C in FIG. 1I, receives the command CM-TO-ANOTHER-CM termination message 216 from network controller CM_A to return the released resources.

In an example embodiment of the invention, the CM_C may send a reconfiguration command to the CE 111 indicating that both a portion or all of the temporarily released resources are provided and also that free/released resources from the network may be provided, and also that resources still reserved for the network may be provided.

FIG. 1H is an example system architecture according to an example embodiment of the invention of FIG. 1A, which illustrates control node or coexistence enabler (CE) 115 of white space object A2 transmitting to the network controller or coexistence manager CM_A, termination message 215 of FIG. 2E, in an example embodiment of the invention.

The network controller or coexistence manager (CM) periodically obtains an indication from the control node or coexistence enabler (CE) whether the release is still valid.

In an example embodiment of the invention, the termination message 215 from the control node or coexistence enabler (CE) may be a response message to the validity check message 213 sent by the network controller or coexistence manager (CM). The response to the validity check message 213 may be either "release is still valid" or "terminate the release". The control node or coexistence enabler (CE) may make this response/indication only when the network controller or coexistence manager (CM) has transmitted the validity check message 213.

In an example embodiment of the invention, when the originating CE wants to terminate the temporary resource release and take back all the allocated resources in use, it indicates the termination to the serving CM in a message sent as a response to a validity check request from the CM.

FIG. 1I is an example system architecture according to an example embodiment of the invention of FIG. 1A, which illustrates the network controller or coexistence manager CM_A, transmitting CM-TO-ANOTHER-CM termination message 216 of FIG. 2F, to coexistence manager CM_C, in an example embodiment of the invention.

The network controller returns the released resources to the originating network controller, when the network controller receives a command from the originating network controller to return the released resources.

In an example embodiment of the invention, a CM that serves a CE and that receives from the CE a temporary release of resources allocated to the CE and its WSO, takes responsibility for maintaining the temporarily released resources on behalf of the CE. The message may be used by the serving CM to indicate termination of the temporary resource release. Such a message may be sent by the serving CM when the releasing CE has declined to continue the release and when the release timer has expired.

FIG. 1J1 is an example system architecture according to an example embodiment of the invention of FIG. 1A, which illustrates the network controller or coexistence manager CM_C, transmitting reconfiguration command—terminate temporary resources 211" similar to FIG. 2A to control node or coexistence enabler (CE) 111 of white space object C2, in an example embodiment of the invention.

In an example embodiment of the invention, a reconfiguration command from the serving CM commands the CE to stop the use of the temporarily the released resources.

FIG. 1J2 is an example system architecture according to an example embodiment of the invention of FIG. 1A, which illustrates the network controller or coexistence manager CM_A, transmitting reconfiguration command terminate temporary resources 211" similar to FIG. 2A, to a second coexistence enabler 115' of a second white space object A1 that CM_A serves, in an example embodiment of the invention.

Figure 3:
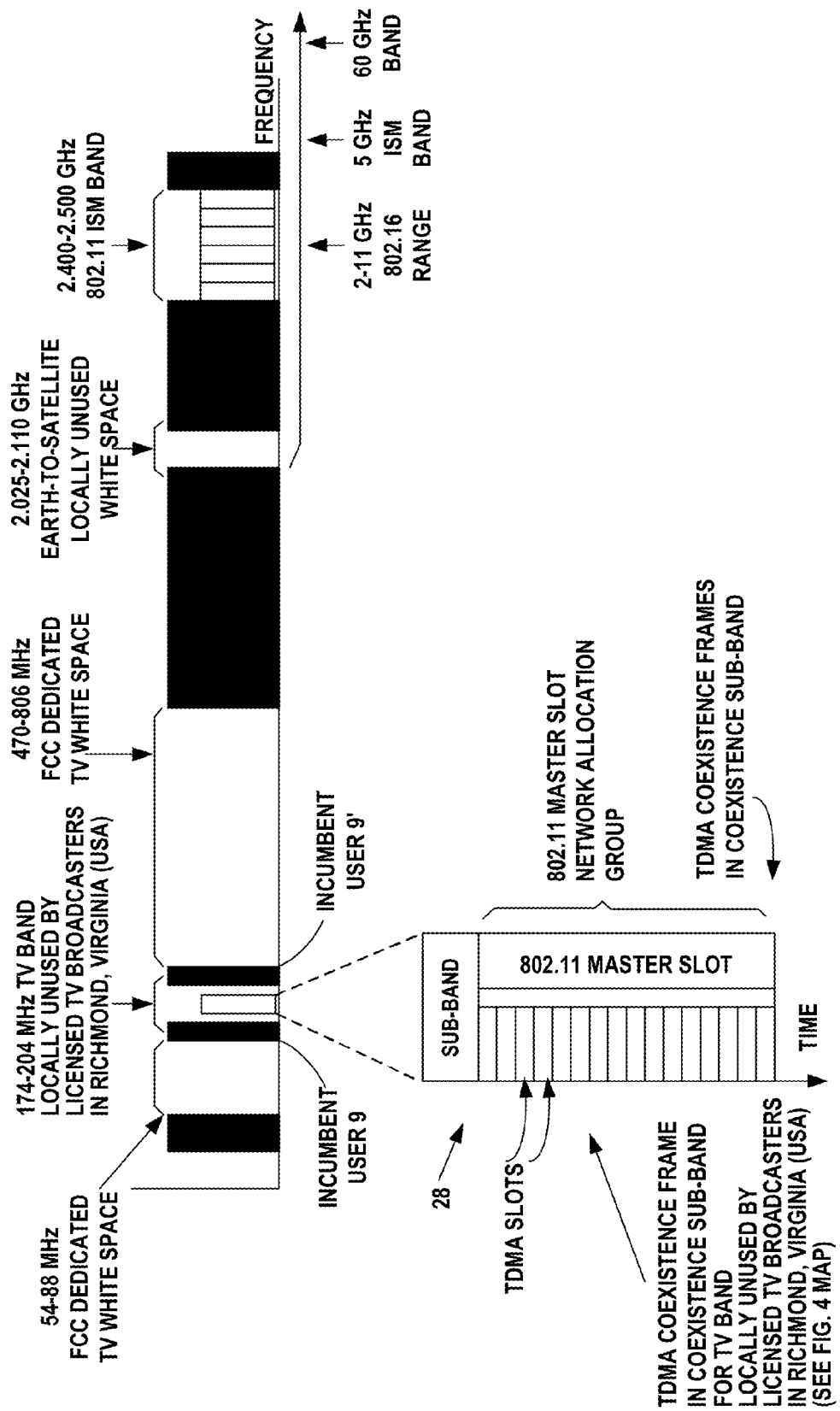
FIG. 3 is a non-limiting example frequency band diagram illustrating an example TDMA coexistence frame sub-band in the TV band white space locally unused by licensed TV broadcasters, representing broadcast TV channels in the Richmond, Va. (USA) area, as shown in FIG. 4, an example TDMA coexistence frame a in sub-band in the FCC dedicated TV band white space, and an example TDMA coexistence frame in a sub-band in the earth station-to-satellite locally unused white space spectrum, according to an embodiment of the present invention.
Figure 4:
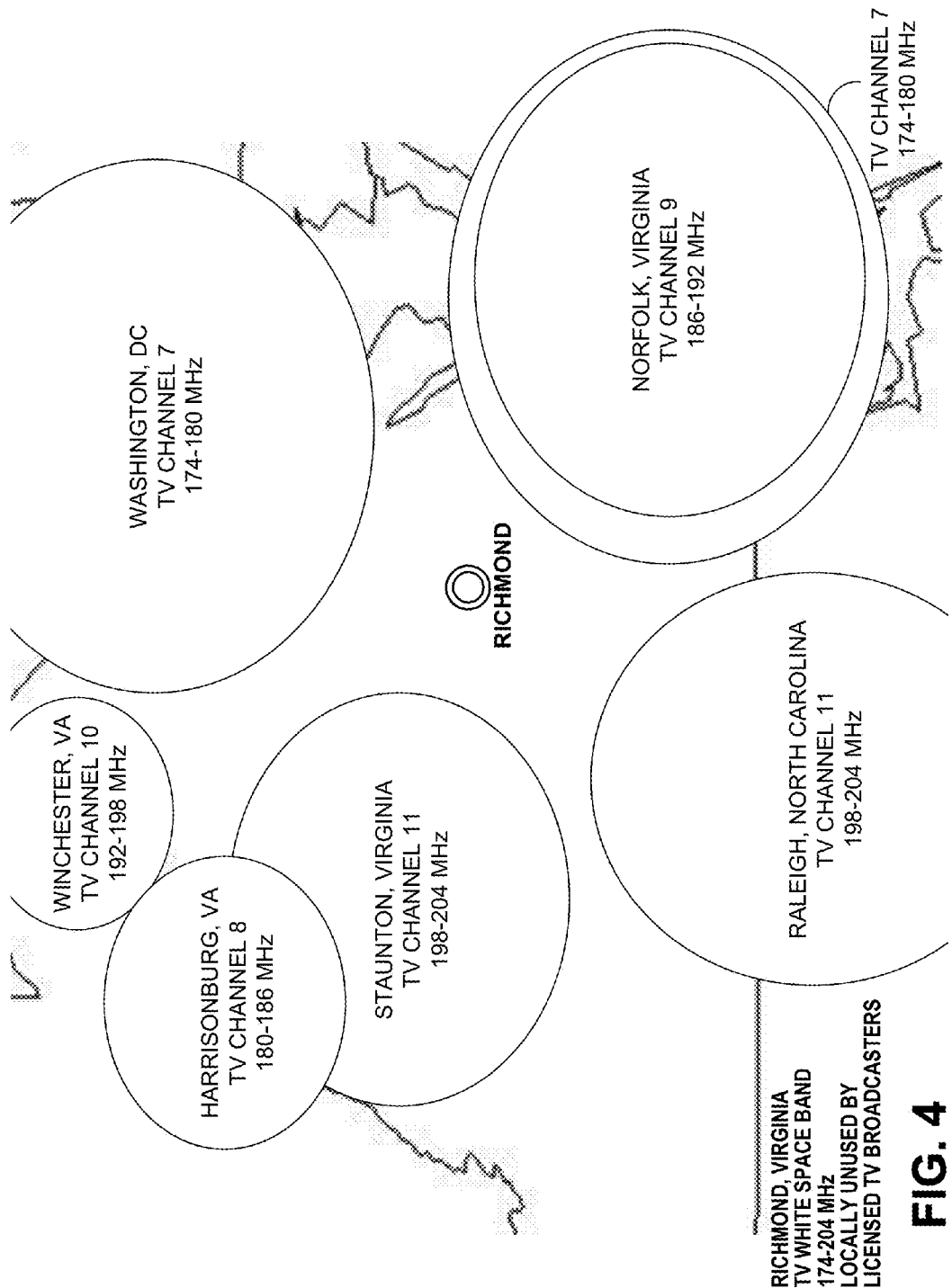
FIG. 4 is an example map of the Richmond, Va. (USA) geographic area and an overlay of coverage areas for broadcast TV channels, illustrating that there is a locally available TV band white space that is unused by licensed TV broadcasters, according to an embodiment of the present invention.

FIG. 3 is a non-limiting example frequency band diagram illustrating an example TDMA coexistence frame sub-band 28 in the TV band white space locally unused by licensed TV broadcasters in the 174-204 MHz band, representing broadcast TV channels 7, 8, 9, 10, and 11 in the Richmond, Va. (USA) area, as shown in FIG. 4, according to an embodiment of the present invention. License-exempt access to these bands as a secondary use for coexistence of networks requesting additional resources, may include restrictions on geographic location, transmission power, range, and bandwidth of the transmissions of the requesting networks.

As a non-limiting example, the 802.11 WLAN standards specify frequencies for operation in the 2.400-2.500 GHz ISM band, the 5 GHz ISM band, and the IEEE 802.11ad Very High Throughput 60 GHz band. The 802.11 WLAN standards specify an OFDM-based physical layer with a bandwidth of 20 MHz channel separation. At 11 MHz from the center of the channel, the energy is approximately 20 dB lower than the maximum signal level. Further away from the center frequency, the energy levels fall further resulting in minimal interference on adjacent channels. The TV band white spaces at 54-88 MHz and at 470-806 MHz are good candidates for coexistence of an 802.11 WLAN wireless LAN channel. The earth station-to-satellite white space spectrum at 2.025 GHz to 2.110 GHz is a good candidate for coexistence of an 802.11 WLAN wireless LAN channel. A TV band white space locally unused by licensed TV broadcasters, for example, in the 174-204 MHz band, representing the local absence of broadcast TV channels 7, 8, 9, 10, and 11, as is the circumstance in the Richmond, Va. (USA) area, is a good candidate for coexistence of an 802.11 WLAN wireless LAN channel.

FIG. 3 shows a non-limiting example of the location of the white spaces in the RF spectrum and example TDMA coexistence frames in the white space spectrum, showing the freely available time slots before any networks have been allocated slots. The white spaces include the FCC dedicated TV white space 54-88 MHz band, the FCC dedicated TV white space 470-806 MHz band, and locally unused the earth station-to-satellite white space spectrum in 2.025 GHz to 2.110 GHz.

In an example embodiment of the invention, there are a number of TVWS coexistence techniques possible for enabling two or more independently operated wireless networks or devices using different radio technologies adapted for TV white space frequency bands, to access the same TV white space frequency band in the same location without mutual interference. Some examples of coexistence techniques include dynamic frequency selection, transmit power control, listen-before-talk behavior, time division multiplexing different IEEE 802 technologies, message-based on-demand spectrum contention, and control through a centralized network controller or coexistence manager.

FIG. 4 shows an example map of the Richmond, Va. (USA) geographic area and an overlay of coverage areas for broadcast TV channels 7, 8, 9, 10, and 11, illustrating that there is a locally available TV band white space that is unused by licensed TV broadcasters in the 174-204 MHz band, as shown in FIG. 3. The cities where there are TV broadcasters for TV channels 7, 8, 9, 10, and 11 in a circular area of approximately 160 kilometers in diameter surrounding the city of Richmond, Va., are shown in the following table. The map of FIG. 4 shows that there is no coverage by licensed TV broadcasters in the 174-204 MHz band, which is therefore a locally available TV band white space.

| | | |
|---|---|---|
| WASHINGTON, DC | TV CHANNEL 7 | 174-180 MHz |
| NORFOLK, VIRGINIA | TV CHANNEL 7 | 174-180 MHz |
| HARRISONBURG, VA | TV CHANNEL 8 | 180-186 MHz |
| WASHINGTON, DC | TV CHANNEL 9 | 186-192 MHz |
| NORFOLK, VIRGINIA | TV CHANNEL 9 | 186-192 MHz |
| WINCHESTER, VA | TV CHANNEL 10 | 192-198 MHz |
| RALEIGH, NC | TV CHANNEL 11 | 198-204 MHz |
| STAUNTON, VIRGINIA | TV CHANNEL 11 | 198-204 MHz |

Figure 5A:
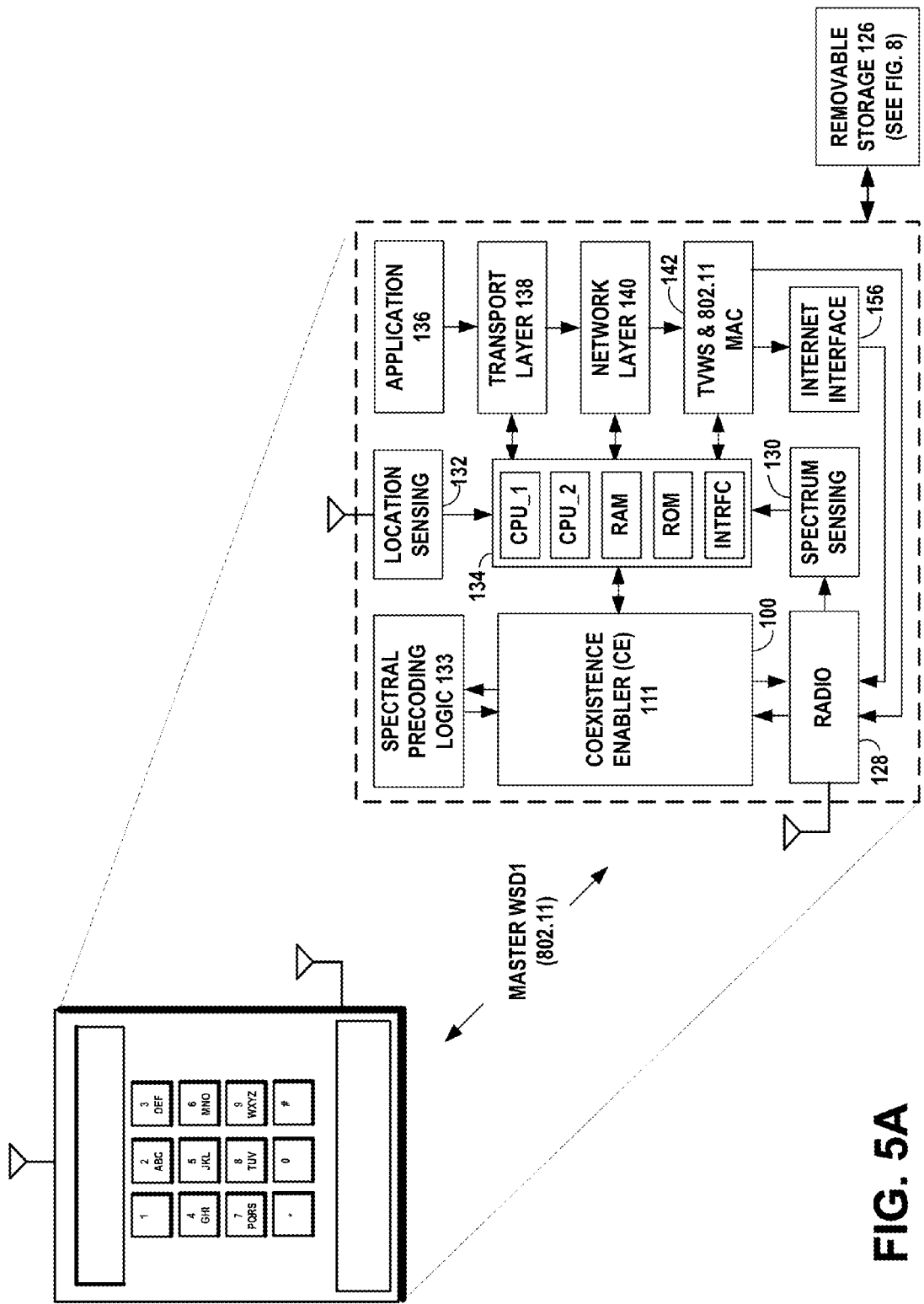
FIG. 5A is a functional block diagram according to an example embodiment of the invention, illustrating an example master WSD1 device including the control node or coexistence enabler for the wireless device. The device may be configured to operate in the TVWS coexistence bands or additional RF spectrum white space spectrum where there may be no primary user radios operating in the neighboring wireless networks, in an example embodiment of the invention.

FIG. 5A is a functional block diagram according to an example embodiment of the invention, illustrating an example master WSD1 device including the control node or coexistence enabler 111 for the wireless device. The device may be configured to operate in the TVWS coexistence bands or additional RF spectrum bands where there may be no primary user radios operating in the neighboring wireless networks, in an example embodiment of the invention.

In an example embodiment of the invention, master WSD1 includes a protocol stack, including the radio 128 and the IEEE 802.11 MAC 142, which may be based, for example, on the IEEE 802.11 WLAN standard. The MAC 142 includes integrated TV white space features. The protocol stack may also include a network layer 140, a transport layer 138, and an application program 136. The example master WSD1 may include a processor 134 that includes a dual or multi core central processing unit CPU_1 and CPU_2, a RAM memory, a ROM memory, and an interface for a keypad, display, and other input/output devices. A location sensor 132, such as a GPS may be included to establish the geographic location of the master WSD1, and the location of the master WSD1 is reported to the network controller or coexistence manager CM_C. The coexistence enabler 111 may send resource requests to the coexistence manager CM_C. The MAC 142 includes integrated TV white space features to communicate using the radio 128 in channels in the TV white spaces band reallocated by the coexistence manager CM_C, without mutual interference. The spectrum sensor 130 senses the electromagnetic environment of the master WSD1 and reports it to the coexistence manager CM_C.

Figure 5B:
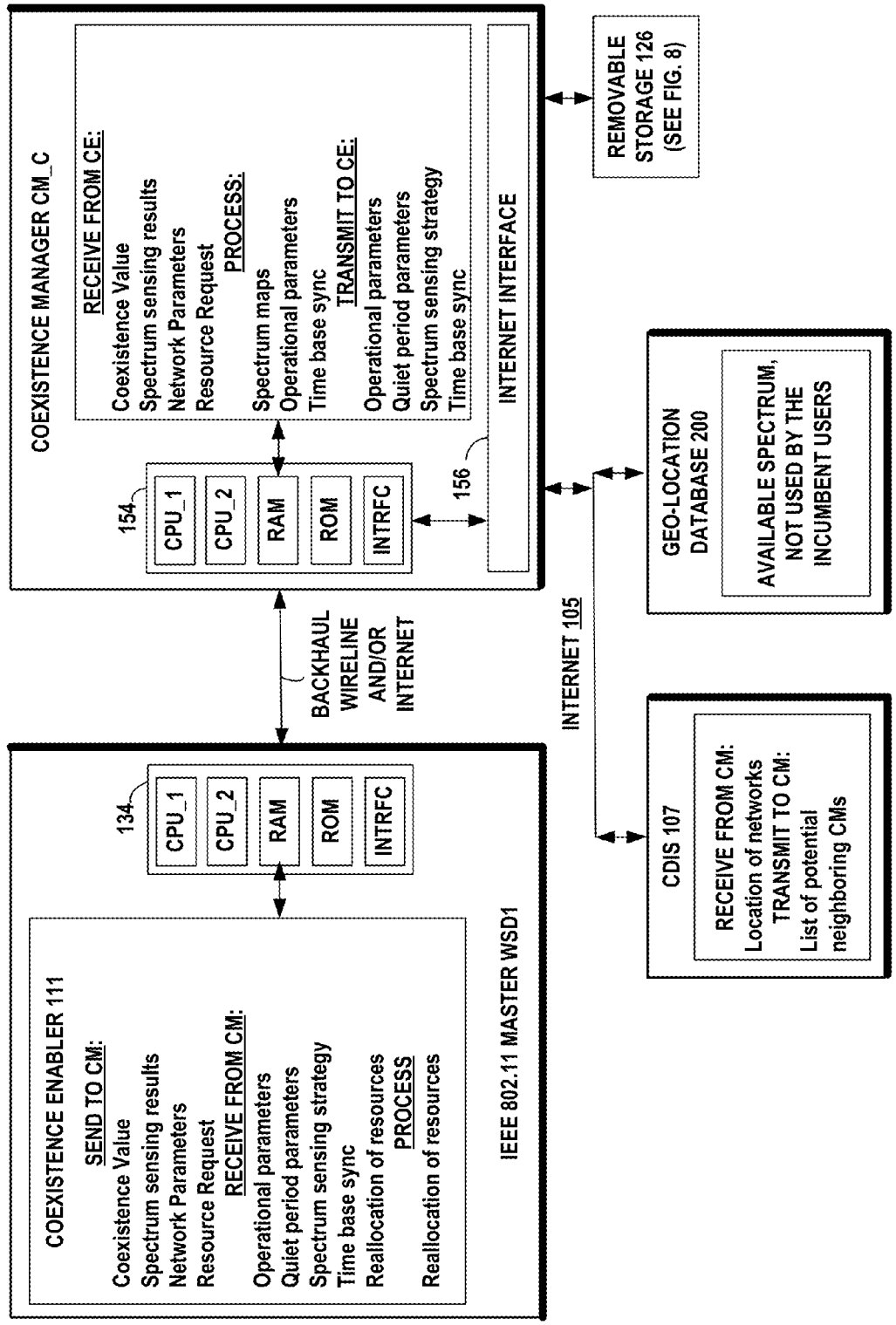
FIG. 5B is an example network diagram according to an embodiment of the present invention, illustrating the control node or coexistence enabler, communicating over a backhaul wireline and/or internet link with the network controller or coexistence manager, in an example embodiment of the invention.

In an example embodiment of the invention, the geo-location database 200 of FIG. 5B, may communicate the allowed emission levels via the Internet 105 to the coexistence manager CM_C, which forwards the allowed emission levels via the Internet 105 to coexistence enabler 111 in the master WSD1.

In an example embodiment of the invention, the master WSD1 includes spectral decoding logic 133. When input data are not properly correlated, a rectangularly-pulsed OFDM signal is discontinuous in phase and thus exhibits large power spectral sidelobes decaying asymptotically as the frequency. Such large sidelobes cause strong interference to adjacent channels and need to be suppressed before transmission. Spectral precoding is capable of suppressing sidelobe powers effectively without trading off system error performance or implementation complexity. By spectral precoding, significant sidelobe suppression is achieved by precoding data symbols in frequency domain without resort to specific data values. The idea is to introduce correlation among data symbols by a fixed precoder matrix in a way that the spectrally-precoded rectangularly-pulsed OFDM signal exhibits extremely small power spectral sidelobes decaying asymptotically, and thereby high spectral efficiency. Spectral precoders are all invertible and thus enable realizable decoding at the receiver while providing good system error performance. An example spectral decoder is described in the publication by Char-Dir Chung, "Spectral Precoding for Constant-Envelope OFDM", *IEEE Transactions on Communications*, vol. 58, no. 2, February 2010, pages 555-567.

In an example embodiment of the invention, the interface circuits in FIG. 5A may interface with one or more radio transceivers, battery and other power sources, key pad, touch screen, display, microphone, speakers, ear pieces, camera or other imaging devices, etc. The RAM and ROM may be removable memory devices such as smart cards, subscriber identity modules (SIMs), wireless identification modules (WIMs), semiconductor memories such as RAM, ROM, PROMS, flash memory devices, etc, as shown in FIG. 9. The processor protocol stack layers, and/or application program may be embodied as program logic stored in the RAM and/or ROM in the form of sequences of programmed instructions which, when executed in the CPU, carry out the functions of example embodiments. The program logic may be delivered to the writeable RAM, PROMS, flash memory devices, etc. of the control node or coexistence enabler and coexistence manager from a computer program product or article of manufacture in the form of computer-usable media such as resident memory devices, smart cards or other removable memory devices. Alternately, they may be embodied as integrated circuit logic in the form of programmed logic arrays or custom designed application specific integrated circuits (ASIC). The one or more radios in the device may be separate transceiver circuits or alternately, the one or more radios may be a single RF module capable of handling one or multiple channels in a high speed, time and frequency multiplexed manner in response to the processor.

The master WSD1 of FIG. 5A includes processor 134 that may access random access memory RAM and/or read only memory ROM in order to obtain stored program code and data for use during processing. The RAM or ROM may generally include removable or imbedded memories that operate in a static or dynamic mode. Further, the RAM or ROM may include rewritable memories such as Flash, EPROM, EEPROM, etc. Examples of removable storage media based on magnetic, electronic and/or optical technologies such as magnetic disks, optical disks, semiconductor memory circuit devices and micro-SD memory cards (SD refers to the Secure Digital standard) are shown at 126 and in FIG. 8, and may serve, for instance, as a data input/output means. Code may include any interpreted or compiled computer language including computer-executable instructions. The code and/or data may be used to create software modules such as operating systems, communication utilities, user interfaces, more specialized program modules, etc.

FIG. 5B is an example network diagram according to an embodiment of the present invention, illustrating the control node or coexistence enabler 111, communicating over a backhaul wireline and/or internet link with the network controller or coexistence manager CM_C, in an example embodiment of the invention. The coexistence manager CM_C may communicate over the internet 105 with the geo-location database 200 and the coexistence network element coexistence discovery and Information server (CDIS) 107, in an example embodiment of the invention.

A master WSD, such as WSD1, may send queries for the available spectrum to a geo-location database 200. Database 200 may comprise some internal structure, for example, in form functional blocks such as processors, memory, software/hardware modules, and the like, for performing operations described herein. Such blocks may for example transmit and receive information such as spectrum information, emission characteristics, and/or allowed operating parameters. The master WSD1 uses the IEEE 802.11 wireless LAN (WLAN) protocol for is normal communications on its IEEE 802.11 links, but it is capable of communicating in white space spectrum on TVWS links 2, 3, and 4. The returned information from the geo-location database 200 enables the operation in the white space spectrum, of both the master WSD1 and its associated slave WSD2 that is within the master WSD1's operational area. There may be other reasons to use TVWS, such as better propagation. Normal communication medium typically is available for WLAN (e.g. 2.4 or 5 GHz), but TVWS may not be available everywhere due primary users.

FIG. 6A is an example flow diagram of operational steps in a control node transmitting to a serving network controller, a temporary release message indicating resources that were kept by the control node, according to an embodiment of the present invention. The steps of the flow diagram 600 of FIG. 6A may represent computer code instructions stored in the RAM and/or ROM memory of the master white space device, which when executed by the central processing units (CPU), carry out the functions of an example embodiment of the invention. The steps may be carried out in another order than shown and individual steps may be combined or separated into component steps.

Step 602: receiving by a control node of a wireless network, an allocation of resources and an indication of allowance to release resources temporarily from a network controller serving the control node; and Step 604: transmitting by the control node to the network controller, a message indicating temporary release of a portion of the allocated resources.

Figure 6B:
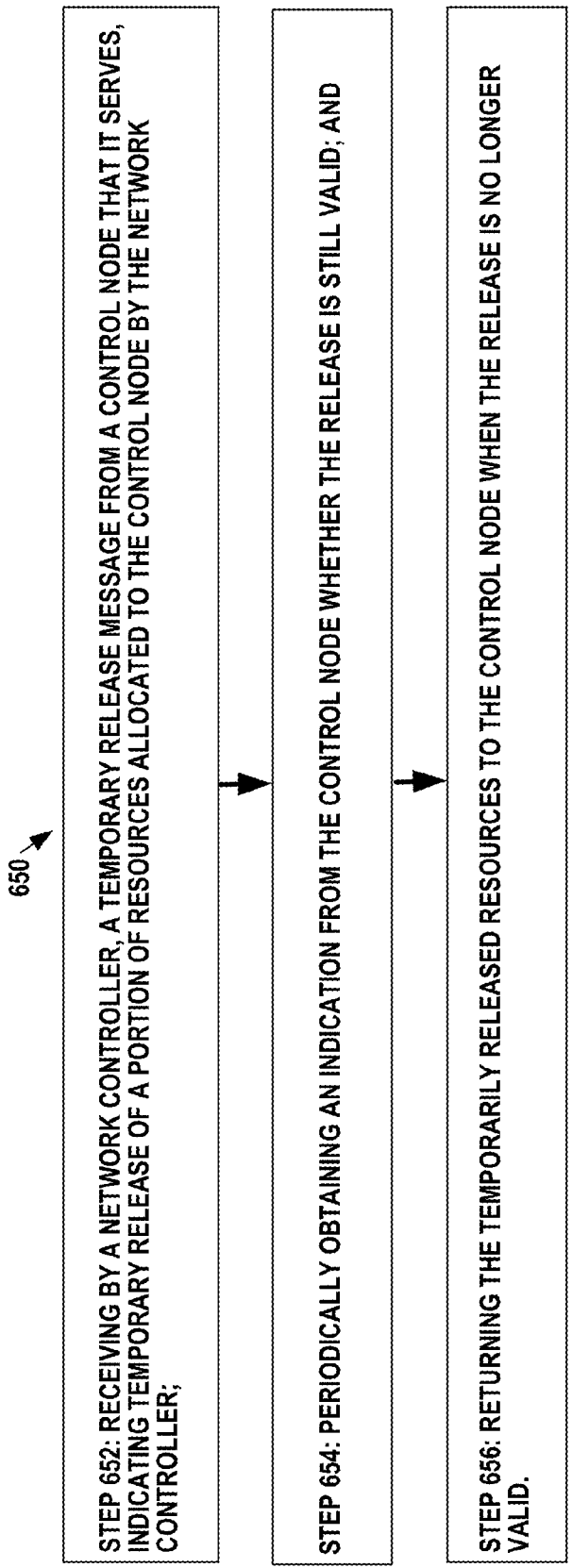
FIG. 6B is an example flow diagram of operational steps in a network controller that receives a temporary release message from a control node that it serves, indicating resources that were kept by the control node, according to an embodiment of the present invention.

FIG. 6B is an example flow diagram of operational steps in a network controller that receives a temporary release message from a control node that it serves, indicating resources that were kept by the control node, according to an embodiment of the present invention. The steps of the flow diagram 650 of FIG. 6B may represent computer code instructions stored in the RAM and/or ROM memory of the slave white space device, which when executed by the central processing units (CPU), carry out the functions of an example embodiment of the invention. The steps may be carried out in another order than shown and individual steps may be combined or separated into component steps.

Step 652: receiving by a network controller, a temporary release message from a control node that it serves, indicating temporary release of a portion of resources allocated to the control node by the network controller;

Step 654: periodically obtaining an indication from the control node whether the release is still valid; and Step 656: returning the temporarily released resources to the control node when the release is no longer valid.

FIG. 6C is an example flow diagram of operational steps in a network controller that receives resources from another network controller, in response to receiving a temporary release message, according to an embodiment of the present invention. The steps of the flow diagram 680 of FIG. 6C may represent computer code instructions stored in the RAM and/or ROM memory of the slave white space device, which when executed by the central processing units (CPU), carry out the functions of an example embodiment of the invention. The steps may be carried out in another order than shown and individual steps may be combined or separated into component steps.

Step 682: receiving by a network controller, resources from another network controller, which were temporarily released by a control node served by the other network controller; and Step 684: returning by the network controller, the released resources to the other network controller, when the network controller receives a command from the other network controller to return the released resources.

Figure 6D:
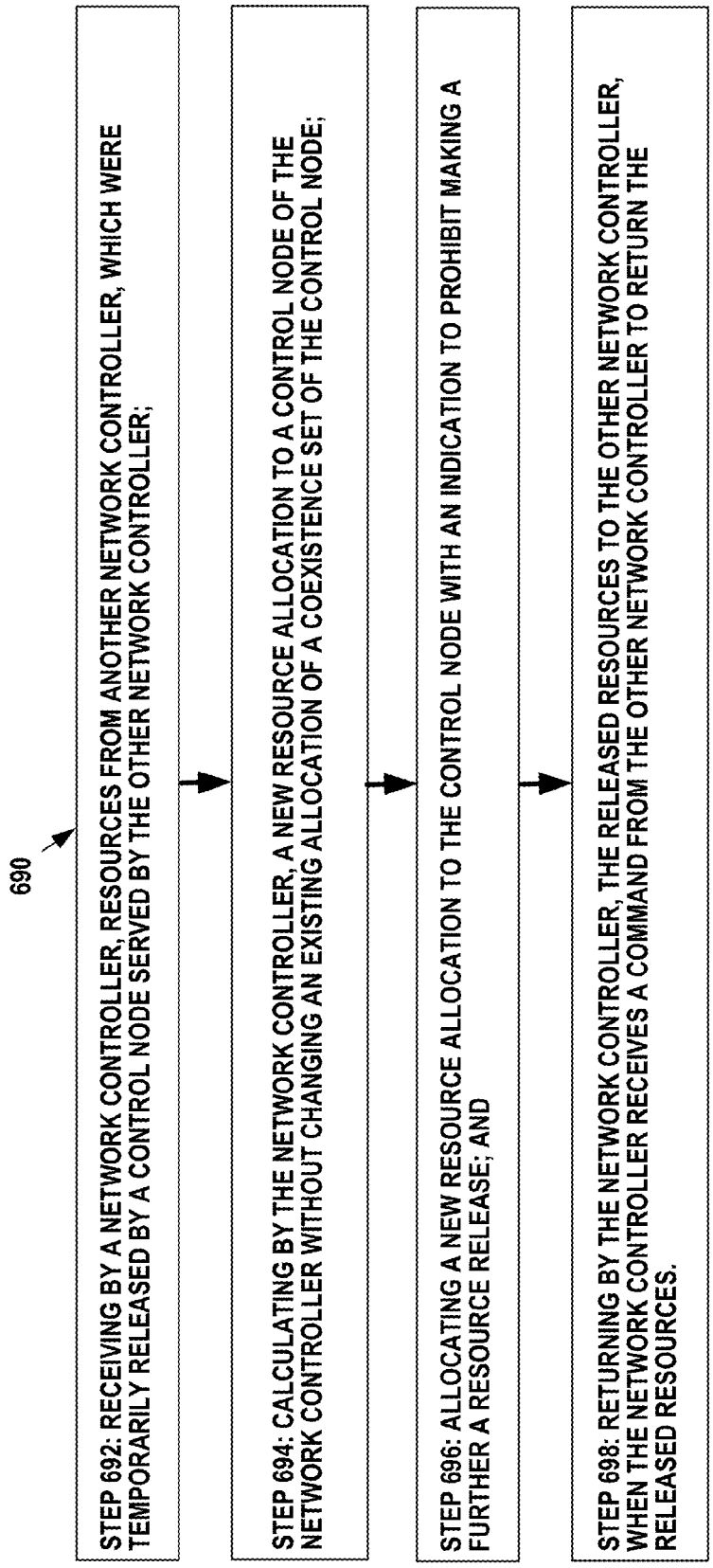
FIG. 6D is an example flow diagram of operational steps in a network controller that receives resources from another network controller and calculates a new resource allocation to a control node of the network controller without changing an existing allocation of a coexistence set of the control node, in response to receiving a temporary release message, according to an embodiment of the present invention.

FIG. 6D is an example flow diagram of operational steps in a network controller that receives resources from another network controller and calculates a new resource allocation to a control node of the network controller without changing an existing allocation of a coexistence set of the control node, in response to receiving a temporary release message, according to an embodiment of the present invention. The steps of the flow diagram 690 of FIG. 6D may represent computer code instructions stored in the RAM and/or ROM memory of the slave white space device, which when executed by the central processing units (CPU), carry out the functions of an example embodiment of the invention. The steps may be carried out in another order than shown and individual steps may be combined or separated into component steps.

Step 692: receiving by a network controller, resources from another network controller, which were temporarily released by a control node served by the other network controller;

Step 694: calculating by the network controller, a new resource allocation to a control node of the network controller without changing an existing allocation of a coexistence set of the control node;

Step 696: allocating a new resource allocation to the control node with an indication to prohibit making a further a resource release; and Step 698: returning by the network controller, the released resources to the other network controller, when the network controller receives a command from the other network controller to return the released resources.

FIG. 7 is an example frequency band diagram illustrating an example TDMA coexistence frame 24' in sub-band 14' in an unpaired time domain duplex frequency white space of 900 to 905 MHz in the uplink portion of a mobile device communications frequency band, according to an example embodiment of the invention. FIG. 7 illustrates an example frequency plan for the example mobile device frequency band, with an uplink portion between 890 and 915 MHz and a down link portion between 935 and 960 MHz, similar to a portion of the frequency plan for GSM. In the example frequency plan shown in FIG. 7, a 5 MHz band between 945 and 950 MHz in the down link portion is reserved for other uses, for example as an emergency services band. Since the time domain duplex operation of the mobile device system requires matched uplink frequencies to the allocated down link frequencies, there is an unpaired band between 900 and 905 MHz in the uplink portion. In accordance with an example embodiment of the invention, the unpaired band between 900 and 905 MHz is used as a coexistence band. FIG. 7 shows an example TDMA coexistence frame 24' in sub-band 14' in the unpaired time domain duplex frequency white space 36 in the uplink portion of the mobile device frequency band, which may be used by the cell base master device WSD5 and the cell slave devices WSD6, WSD7, and WSD8 in FIG. 1A.

Figure 8:
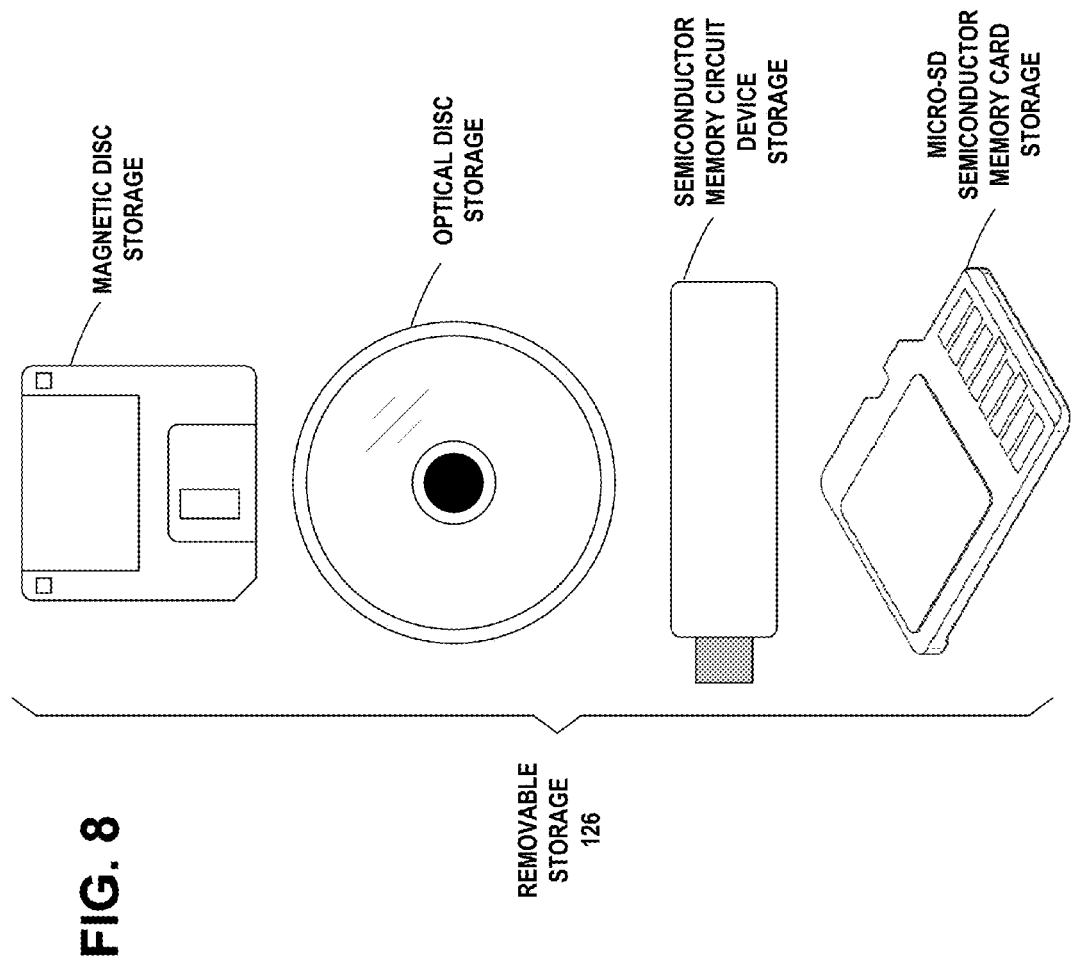
FIG. 8 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

FIG. 8 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard), for storing data and/or computer program code as an example computer program product, in accordance with at least one embodiment of the present invention.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, phone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

The invention claimed is:

1. A method, comprising:

receiving by a control node of a wireless network, an allocation of resources and an indication of allowance to release resources temporarily from a network controller serving the control node, wherein the allocated resources are radio resources comprising one or more channels within a TV white space radio spectrum and the control node controls operation and/or channel allocation of the wireless local area network;

determining by the control node that only a portion of the allocated one or more channels of radio resources are in use by the wireless network and making the rest of the allocated one or more channels of radio resources available as a temporarily released portion of the allocated one or more channels of radio resources for other wireless networks on a temporary basis for as long as the release remains valid;

transmitting by the control node to the serving network controller, a message indicating temporary release of the temporarily released portion of the allocated of the one or more channels of radio resources enabling the serving network controller to indicate to other network controllers servicing other networks of the availability of the temporarily released portion of the allocated of the one or more channels of radio resources;

transmitting by the control node to the serving network controller, a termination message indicating that the temporary release is no longer valid enabling the serving network controller to indicate to the other network controllers servicing the other networks that the temporarily released portion of the allocated one or more channels of radio resources is no longer valid; and taking back, by the control node from the serving network controller, the temporarily released portion of the allocated one or more channels of radio resources, in response to having transmitted the termination message.

2. The method of claim 1, further comprising:

determining by the control node whether the release remains valid;

periodically indicating by the control node to the network controller, whether the release is still valid; and receiving by the control node, a return of the temporarily released resources from the network controller, when the release is no longer valid.

3. A method, comprising:

receiving by a network controller, a temporary release message from a control node that it serves, indicating temporary release of a portion of one or more channels of radio resources allocated to the control node by the network controller, wherein the allocated resources are radio resources comprising one or more channels within a TV white space radio spectrum and the control node controls operation and/or channel allocation of the wireless local area network, the temporary release message enabling the network controller to indicate to other network controllers servicing other networks of the availability of the temporarily released portion of the allocated one or more channels of radio resources;

periodically obtaining an indication from the control node that it serves whether the temporary release is still valid; and returning the temporarily released portion of the allocated one or more channels of radio resources to the control node that it serves when a termination message is received from the control node indicating that the temporary release is no longer valid.

4. The method of claim 3, further comprising:

transmitting by the network controller, at least a portion of the resources released by the control node, to one or more other network controllers; and receiving by the network controller, a return of the released resources from the one or more other network controllers, when the network controller transmits a command to the one or more other network controllers to return the released resources.

5. A method, comprising:

receiving by a network controller, temporarily released one or more channels of radio resources from another network controller, which were temporarily released by a control node served by the other network controller, wherein the temporarily released one or more channels of radio resources are radio resources comprising one or more channels within a TV white space radio spectrum and the control node controls operation and/or channel allocation of a wireless local area network;

allocating by the network controller, a resource allocation of at least a portion of the temporarily released one or more channels of radio resources, to a control node served by the network controller; and returning by the network controller, the temporarily released one or more channels of radio resources to the other network controller, when the network controller receives a command from the other network controller to return the temporarily released one or more channels of radio resources, for return of the temporarily released one or more channels of radio resources to the control node served by the other network controller.

6. An apparatus, comprising:

at least one processor;

at least one memory including computer program code;

the at least one memory and the computer program code configured to, with the at least one processor, cause the apparatus at least to:

receive an allocation of resources and an indication of allowance to release resources temporarily from a network controller serving the apparatus, wherein the allocated resources are radio resources comprising one or more channels within a TV white space radio spectrum and the apparatus controls operation and/or channel allocation of the wireless local area network;

determine that only a portion of the allocated one or more channels of radio resources are in use by the wireless network and make the rest of the allocated one or more channels of radio resources available as a temporarily released portion of the allocated one or more channels of radio resources for other wireless networks on a temporary basis for as long as the release remains valid;

transmit to the serving network controller, a message indicating temporary release of the temporarily released portion of the allocated one or more channels of radio resources enabling the serving network controller to indicate to other network controllers servicing other networks of the availability of the temporarily released portion of the allocated one or more channels of radio resources;

transmit to the serving network controller, a termination message indicating that the temporary release is no longer valid enabling the serving network controller to indicate to the other network controllers servicing the other networks that the temporarily released portion of the allocated one or more channels of radio resources is no longer valid; and take back from the serving network controller, the temporarily released portion of the allocated one or more channels of radio resources, in response to having transmitted the termination message.

7. The apparatus of claim 6, further comprising:

the at least one memory and the computer program code configured to, with the at least one processor, cause the apparatus at least to:

determine whether the release remains valid;

periodically indicate to the network controller, whether the release is still valid; and receive a return of the temporarily released resources from the network controller, when the release is no longer valid.

8. An apparatus, comprising:

at least one processor;

at least one memory including computer program code;

the at least one memory and the computer program code configured to, with the at least one processor, cause the apparatus at least to:

receive a temporary release message from a control node that the apparatus serves, indicating temporary release of a portion of one or more channels of radio resources allocated to the control node by the apparatus, wherein the allocated resources are radio resources comprising one or more channels within a TV white space radio spectrum and the control node controls operation and/ or channel allocation of the wireless local area network, the temporary release message enabling the apparatus to indicate to other network controllers servicing other networks of the availability of the temporarily released portion of the allocated one or more channels of radio resources;

periodically obtain an indication from the control node that it serves whether the temporary release is still valid; and return the temporarily released portion of the allocated one or more channels of radio resources to the control node that it serves when a termination message is received from the control node indicating that the temporary release is no longer valid.

9. The apparatus of claim 8, further comprising:

the at least one memory and the computer program code configured to, with the at least one processor, cause the apparatus at least to:

transmit at least a portion of the resources released by the control node, to one or more other network controllers; and receive a return of the released resources from the one or more other network controllers, when the apparatus transmits a command to the one or more other network controllers to return the released resources.

10. An apparatus, comprising:

at least one processor;

at least one memory including computer program code;

the at least one memory and the computer program code configured to, with the at least one processor, cause the apparatus at least to:

receive temporarily released one or more channels of radio resources from another network controller, which were temporarily released by a control node served by the other network controller, wherein the temporarily released one or more channels of radio resources are radio resources comprising one or more channels within a TV white space radio spectrum and the control node controls operation and/or channel allocation of the wireless local area network;

allocate a resource allocation of at least a portion of the temporarily released one or more channels of radio resources, to a control node served by the apparatus; and return the temporarily released one or more channels of radio resources to the other network controller, when the apparatus receives a command from the other network controller to return the temporarily released one or more channels of radio resources, for return of the temporarily released one or more channels of radio resources to the control node served by the other network controller.

11. A computer program product comprising computer executable program code recorded on a computer readable, non-transitory storage medium, the computer executable program code comprising:

code for receiving by a control node of a wireless network, an allocation of resources and an indication of allowance to release resources temporarily from a network controller serving the control node, wherein the allocated resources are radio resources comprising one or more channels within a TV white space radio spectrum and the control node controls operation and/or channel allocation of the wireless local area network;

code for determining by the control node that only a portion of the allocated one or more channels of radio resources are in use by the wireless network and making the rest of the allocated one or more channels of radio resources available as a temporarily released portion of the allocated one or more channels of radio resources for other wireless networks on a temporary basis for as long as the release remains valid;

code for transmitting by the control node to the serving network controller, a message indicating temporary release of the temporarily released portion of the allocated of the one or more channels of radio resources enabling the serving network controller to indicate to other network controllers servicing other networks of the availability of the temporarily released portion of the allocated of the one or more channels of radio resources;

code for transmitting by the control node to the serving network controller, a termination message indicating that the temporary release is no longer valid enabling the serving network controller to indicate to the other network controllers servicing the other networks that the temporarily released portion of the allocated one or more channels of radio resources is no longer valid; and code for taking back, by the control node from the serving network controller, the temporarily released portion of the allocated one or more channels of radio resources, in response to having transmitted the termination message.

12. The computer program product of claim 11, further comprising:

code for determining by the control node whether the release remains valid;

code for periodically indicating by the control node to the network controller, whether the release is still valid; and code for receiving by the control node, a return of the temporarily released resources from the network controller, when the release is no longer valid.

13. A computer program product comprising computer executable program code recorded on a computer readable, non-transitory storage medium, the computer executable program code comprising:

code for receiving by a network controller, a temporary release message from a control node that it serves, indicating temporary release of a portion of one or more channels of radio resources allocated to the control node by the network controller, wherein the allocated resources are radio resources comprising one or more channels within a TV white space radio spectrum and the control node controls operation and/or channel allocation of the wireless local area network, the temporary release message enabling the network controller to indicate to other network controllers servicing other networks of the availability of the temporarily released portion of the allocated one or more channels of radio resources;

code for periodically obtaining an indication from the control node that it serves whether the temporary release is still valid; and code for returning the temporarily released portion of the allocated one or more channels of radio resources to the control node that it serves when a termination message is received from the control node indicating that the temporary release is no longer valid.

14. The computer program product of claim 13, further comprising:

code for transmitting by the network controller, at least a portion of the resources released by the control node, to one or more other network controllers; and code for receiving by the network controller, a return of the released resources from the one or more other network controllers, when the network controller transmits a command to the one or more other network controllers to return the released resources.

15. A computer program product comprising computer executable program code recorded on a computer readable, non-transitory storage medium, the computer executable program code comprising:
    code for receiving by a network controller, temporarily released one or more channels of radio resources from another network controller, which were temporarily released by a control node served by the other network controller, wherein the temporarily released one or more channels of radio resources are radio resources comprising one or more channels within a TV white space radio spectrum and the control node controls operation and/or channel allocation of a wireless local area network;
    code for allocating by the network controller, a resource allocation of at least a portion of the temporarily released one or more channels of radio resources, to a control node served by the network controller; and
    code for returning by the network controller, the temporarily released one or more channels of radio resources to the other network controller, when the network controller receives a command from the other network controller to return the temporarily released one or more channels of radio resources, for return of the temporarily released one or more channels of radio resources to the control node served by the other network controller.

16. The method of claim 3, further comprising:
    transmitting by the network controller, at least a portion of the resources released by the control node, to a second control node that it serves; and
    receiving by the network controller, a return of the released resources from the second control node, when the network controller transmits a command to the second control node to return the released resources, for return of the released resources to the first said control node.

17. The apparatus of claim 8, further comprising:
    the at least one memory and the computer program code configured to, with the at least one processor, cause the apparatus at least to:
    transmit at least a portion of the resources released by the control node, to a second control node that the apparatus serves; and
    receive a return of the released resources from the second control node, when the apparatus transmits a command to the second control node to return the released resources, for return of the released resources to the first said control node.

18. The computer program product of claim 13, further comprising:
    code for transmitting by the network controller, at least a portion of the resources released by the control node, to a second control node that it serves; and
    code receiving by the network controller, a return of the released resources from the second control node, when the network controller transmits a command to the second control node to return the released resources, for return of the released resources to the first said control node.

19. A method, comprising:
    receiving by a network controller, temporarily released one or more channels of radio resources from another network controller, which were temporarily released by a control node served by the other network controller, wherein the temporarily released one or more channels of radio resources are radio resources comprising one or more channels within a TV white space radio spectrum and the control node controls operation and/or channel allocation of a wireless local area network;
    calculating by the network controller, a new resource allocation to a control node served by the network controller without changing an existing allocation of a coexistence set of the control node;
    allocating a new resource allocation to the control node served by the network controller with an indication to prohibit making a further a resource release; and
    returning by the network controller, the temporarily released one or more channels of radio resources to the other network controller, when the network controller receives a command from the other network controller to return the temporarily released one or more channels of radio resources, for return of the temporarily released one or more channels of radio resources to the control node served by the other network controller.

20. An apparatus, comprising:
    at least one processor;
    at least one memory including computer program code;
    the at least one memory and the computer program code configured to, with the at least one processor, cause the apparatus at least to:
    receive temporarily released one or more channels of radio resources from another network controller, which were temporarily released by a control node served by the other network controller, wherein the temporarily released one or more channels of radio resources are radio resources comprising one or more channels within a TV white space radio spectrum and the control node controls operation and/or channel allocation of a wireless local area network;
    calculate a new resource allocation to a control node served by the apparatus without changing an existing allocation of a coexistence set of the control node;
    allocate a new resource allocation to the control node served by the apparatus with an indication to prohibit making a further a resource release; and
    return the temporarily released one or more channels of radio resources to the other network controller, when the network controller receives a command from the other network controller to return the temporarily released one or more channels of radio resources, for return of the temporarily released one or more channels of radio resources to the control node served by the other network controller.

21. A computer program product comprising computer executable program code recorded on a computer readable, non-transitory storage medium, the computer executable program code comprising:
    code for receiving by a network controller, temporarily released one or more channels of radio resources from another network controller, which were temporarily released by a control node served by the other network controller, wherein the temporarily released one or more channels of radio resources are radio resources comprising one or more channels within a TV white space radio spectrum and the control node controls operation and/or channel allocation of a wireless local area network;
    code for calculating by the network controller, a new resource allocation to a control node served by the network controller without changing an existing allocation of a coexistence set of the control node;

code for allocating a new resource allocation to the control node served by the network controller with an indication to prohibit making a further a resource release; and code for returning by the network controller, the temporarily released one or more channels of radio resources to the other network controller, when the network controller receives a command from the other network controller to return the temporarily released one or more channels of radio resources, for return of the temporarily released one or more channels of radio resources to the control node served by the other network controller.

22. The method of claim 2, further comprising:

wherein the periodically indicating by the control node to the network controller, whether the release is still valid, happens in response to receiving a request or status query from the network controller.

23. The method of claim 3, further comprising:

wherein the periodically obtaining an indication from the control node whether the release is still valid, happens in response to sending a request or status query to the control node.

\* \* \* \* \*